(12) United States Patent
Matsuda et al.

(10) Patent No.: US 8,433,754 B2
(45) Date of Patent: Apr. 30, 2013

(54) SYSTEM, METHOD AND APPARATUS ENABLING EXCHANGE OF LIST OF CONTENT DATA ITEMS

(75) Inventors: Masafumi Matsuda, Tokyo (JP); Akira Tange, Kanagawa (JP)

(73) Assignee: Sony Corporation, Tokyo (JP)

( * ) Notice: Subject to any disclaimer, the term of this patent is extended or adjusted under 35 U.S.C. 154(b) by 719 days.

(21) Appl. No.: 11/714,994

(22) Filed: Mar. 7, 2007

(65) Prior Publication Data

US 2007/0168360 A1   Jul. 19, 2007

Related U.S. Application Data

(63) Continuation of application No. 10/624,304, filed on Jul. 22, 2003, now Pat. No. 7,444,339.

(51) Int. Cl.
*G06F 15/16* (2006.01)
*G06Q 30/00* (2012.01)

(52) U.S. Cl.
USPC ............... 709/204; 705/26.7; 705/347

(58) Field of Classification Search ............... 709/204, 709/217, 227; 370/360; 455/3.01, 41, 436, 455/41.2, 418; 601/46; 713/176; 84/609, 84/600; 707/10, 5; 705/10, 26.7, 347
See application file for complete search history.

(56) References Cited

U.S. PATENT DOCUMENTS

| | | |
|---|---|---|
| 4,633,751 A | 1/1987 | Fukaya et al. |
| 5,062,341 A | 11/1991 | Reiling et al. |
| 5,756,916 A | 5/1998 | Aoki et al. |
| 5,761,508 A | 6/1998 | Okuno |
| 5,805,671 A | 9/1998 | Ohuchi |
| 5,870,454 A | 2/1999 | Dahlen |
| 5,880,388 A | 3/1999 | Kajiyama et al. |
| 5,902,948 A | 5/1999 | Haruyama |
| 5,982,520 A | 11/1999 | Weiser et al. |

(Continued)

FOREIGN PATENT DOCUMENTS

| | | |
|---|---|---|
| JP | 11-052965 A | 2/1999 |
| JP | 2002-108350 A | 4/2002 |

(Continued)

OTHER PUBLICATIONS

Dawes et al. "Some Assembly Required: building a digital government for the 21$^{st}$ century", Proceedings of the 2000 Annual National Conference on Digital Government Research, ACM-2000, pp. 1-38.

(Continued)

*Primary Examiner* — Aaron Strange
(74) *Attorney, Agent, or Firm* — Wolf, Greenfield & Sacks, P.C.

(57) ABSTRACT

A data processing apparatus is disclosed which includes a reproducing element for reproducing each of a plurality of content data items, a reproduction status detecting element for detecting status of each content data item being reproduced by the reproducing element, a selecting element for selecting the content data item being reproduced by the reproducing element depending on the reproduction status of the content data item detected by the reproduction status detecting element a content identification data generating element for generating content identification data for identifying the content data item selected by the selecting element from the plurality of content data items, and a transmitting element for transmitting to a second data processing apparatus the content identification data generated by the content identification data generating element.

27 Claims, 22 Drawing Sheets

U.S. PATENT DOCUMENTS

| | | | |
|---|---|---|---|
| 6,027,463 A * | 2/2000 | Moriyasu | 601/46 |
| 6,266,667 B1 | 7/2001 | Olsson | |
| 6,283,764 B2 | 9/2001 | Kajiyama et al. | |
| 6,438,393 B1 | 8/2002 | Suuronen | |
| 6,495,747 B2 | 12/2002 | Shimaya et al. | |
| 6,515,212 B2 | 2/2003 | Taira et al. | |
| 6,590,733 B1 | 7/2003 | Wilson et al. | |
| 6,636,836 B1 | 10/2003 | Pyo | |
| 6,658,527 B1 | 12/2003 | Hiroyasu | |
| 6,678,680 B1 | 1/2004 | Woo | |
| 6,687,193 B2 | 2/2004 | Jung | |
| 6,687,802 B1 | 2/2004 | Kori et al. | |
| 6,751,612 B1 | 6/2004 | Schuetze et al. | |
| 6,785,542 B1 | 8/2004 | Blight et al. | |
| 6,871,205 B1 | 3/2005 | Yamada et al. | |
| 6,894,859 B2 | 5/2005 | Hayashi et al. | |
| 6,999,721 B2 * | 2/2006 | Ollis et al. | 455/41.2 |
| 7,032,819 B2 | 4/2006 | Iida et al. | |
| 7,054,867 B2 * | 5/2006 | Bosley et al. | 707/10 |
| 7,072,846 B1 * | 7/2006 | Robinson | 705/10 |
| 7,093,137 B1 | 8/2006 | Sato et al. | |
| 7,102,067 B2 * | 9/2006 | Gang et al. | 84/600 |
| 7,103,589 B1 | 9/2006 | Kepler et al. | |
| 7,103,663 B2 | 9/2006 | Inoue et al. | |
| 7,142,536 B1 * | 11/2006 | Gossett et al. | 370/360 |
| 7,197,306 B1 * | 3/2007 | Song | 455/436 |
| 7,212,785 B2 * | 5/2007 | Brassil et al. | 455/41.2 |
| 7,231,174 B2 * | 6/2007 | Sato | 455/3.01 |
| 7,247,784 B2 | 7/2007 | Muraki et al. | |
| 7,284,036 B2 * | 10/2007 | Ramaswamy | 709/217 |
| 7,505,959 B2 * | 3/2009 | Kaiser et al. | 1/1 |
| 2001/0006771 A1 | 7/2001 | Kajiyama et al. | |
| 2001/0013983 A1 | 8/2001 | Izawa et al. | |
| 2001/0018341 A1 * | 8/2001 | Dao et al. | 455/418 |
| 2001/0038580 A1 | 11/2001 | Jung | |
| 2001/0039870 A1 | 11/2001 | Shimaya et al. | |
| 2001/0042128 A1 | 11/2001 | Hirayama | |
| 2001/0049278 A1 | 12/2001 | Negishi | |
| 2001/0053994 A1 | 12/2001 | Atcheson et al. | |
| 2002/0002035 A1 * | 1/2002 | Sim et al. | 455/41 |
| 2002/0010826 A1 | 1/2002 | Takahashi et al. | |
| 2002/0025838 A1 | 2/2002 | Kawamura | |
| 2002/0034130 A1 | 3/2002 | Tagawa et al. | |
| 2002/0035692 A1 | 3/2002 | Moriai | |
| 2002/0057609 A1 | 5/2002 | Hayashi et al. | |
| 2002/0058521 A1 | 5/2002 | Yamada et al. | |
| 2002/0059237 A1 | 5/2002 | Kumagai et al. | |
| 2002/0065721 A1 | 5/2002 | Lema et al. | |
| 2002/0069746 A1 | 6/2002 | Taira et al. | |
| 2002/0082917 A1 | 6/2002 | Takano | |
| 2002/0083084 A1 | 6/2002 | Sugiyama | |
| 2002/0083472 A1 | 6/2002 | Hirayama | |
| 2002/0087656 A1 | 7/2002 | Gargiulo et al. | |
| 2002/0090206 A1 | 7/2002 | Kikuchi et al. | |
| 2002/0091049 A1 | 7/2002 | Hisano et al. | |
| 2002/0126553 A1 | 9/2002 | Denda et al. | |
| 2002/0131594 A1 | 9/2002 | Hori et al. | |
| 2002/0132612 A1 | 9/2002 | Ishii | |
| 2002/0132614 A1 | 9/2002 | Vanluijt et al. | |
| 2002/0143241 A1 | 10/2002 | Thorell | |
| 2002/0148343 A1 * | 10/2002 | Gross | 84/609 |
| 2002/0152262 A1 | 10/2002 | Arkin et al. | |
| 2002/0156802 A1 | 10/2002 | Takayama et al. | |
| 2002/0161715 A1 | 10/2002 | Koyata et al. | |
| 2002/0168938 A1 * | 11/2002 | Chang | 455/41 |
| 2002/0170414 A1 | 11/2002 | Ueshima et al. | |
| 2002/0183048 A1 | 12/2002 | Takeuchi | |
| 2002/0189427 A1 | 12/2002 | Pachet | |
| 2002/0197956 A1 | 12/2002 | Annola et al. | |
| 2003/0001948 A1 | 1/2003 | Mochizuki | |
| 2003/0009770 A1 | 1/2003 | Tantawy et al. | |
| 2003/0013432 A1 | 1/2003 | Fukaya | |
| 2003/0014407 A1 | 1/2003 | Blatter et al. | |
| 2003/0023421 A1 | 1/2003 | Finn et al. | |
| 2003/0033325 A1 | 2/2003 | Boogaard | |
| 2003/0037104 A1 | 2/2003 | Okamura | |
| 2003/0046076 A1 | 3/2003 | Hirota et al. | |
| 2003/0050058 A1 | 3/2003 | Walsh et al. | |
| 2003/0078941 A1 | 4/2003 | Kawakami et al. | |
| 2003/0078986 A1 | 4/2003 | Ayres et al. | |
| 2003/0079222 A1 | 4/2003 | Boykin et al. | |
| 2003/0081776 A1 | 5/2003 | Candelore | |
| 2003/0088563 A1 | 5/2003 | Yamane et al. | |
| 2003/0115589 A1 | 6/2003 | D'Souza et al. | |
| 2003/0149612 A1 | 8/2003 | Berghofer et al. | |
| 2003/0152247 A1 | 8/2003 | Okajima et al. | |
| 2003/0167352 A1 | 9/2003 | Hoshiai et al. | |
| 2003/0174593 A1 | 9/2003 | Tagawa et al. | |
| 2003/0176206 A1 | 9/2003 | Taniguchi et al. | |
| 2003/0187863 A1 | 10/2003 | Kohut et al. | |
| 2003/0191753 A1 * | 10/2003 | Hoch | 707/3 |
| 2003/0220125 A1 | 11/2003 | Ito et al. | |
| 2003/0220835 A1 | 11/2003 | Barnes, Jr. | |
| 2003/0228842 A1 * | 12/2003 | Heinonen et al. | 455/41.2 |
| 2003/0233399 A1 | 12/2003 | Prohel et al. | |
| 2003/0236890 A1 * | 12/2003 | Hurwitz et al. | 709/227 |
| 2004/0003090 A1 | 1/2004 | Deeds | |
| 2004/0015989 A1 | 1/2004 | Kaizu et al. | |
| 2004/0030691 A1 | 2/2004 | Woo | |
| 2004/0092226 A1 | 5/2004 | Tsutsui et al. | |
| 2004/0199525 A1 | 10/2004 | Matsuda et al. | |
| 2004/0204135 A1 | 10/2004 | Zhao et al. | |
| 2004/0242203 A1 | 12/2004 | Lipsanen et al. | |
| 2005/0004875 A1 | 1/2005 | Kontio et al. | |
| 2005/0021420 A1 | 1/2005 | Michelitsch et al. | |
| 2005/0146995 A1 | 7/2005 | Morita | |
| 2005/0154764 A1 | 7/2005 | Riegler et al. | |
| 2005/0160270 A1 * | 7/2005 | Goldberg et al. | 713/176 |
| 2005/0193126 A1 | 9/2005 | Inoue | |
| 2005/0265696 A1 | 12/2005 | Tagawa et al. | |
| 2006/0053226 A1 | 3/2006 | Okamura | |
| 2006/0056430 A1 | 3/2006 | Okamura | |
| 2006/0069765 A1 | 3/2006 | Okamura | |
| 2006/0095512 A1 | 5/2006 | Noma | |
| 2006/0107300 A1 | 5/2006 | Hirayama | |
| 2006/0174138 A1 | 8/2006 | Yoneda | |
| 2006/0212444 A1 * | 9/2006 | Handman et al. | 707/5 |
| 2006/0217060 A1 | 9/2006 | Tsutsui et al. | |
| 2006/0265369 A1 | 11/2006 | Atcheson et al. | |
| 2007/0043739 A1 | 2/2007 | Takai et al. | |
| 2007/0054660 A1 | 3/2007 | Cardina et al. | |
| 2007/0061473 A1 | 3/2007 | Kovata et al. | |
| 2007/0086473 A1 | 4/2007 | Lin et al. | |
| 2007/0162395 A1 | 7/2007 | Ben-Yaacov et al. | |
| 2007/0189504 A1 | 8/2007 | Silver et al. | |
| 2007/0208735 A1 | 9/2007 | Matsuda et al. | |

FOREIGN PATENT DOCUMENTS

| | | |
|---|---|---|
| JP | 2002-123272 | 4/2002 |
| JP | 2002-175234 A | 6/2002 |
| JP | 2002-189663 | 7/2002 |
| JP | 2002-202785 | 7/2002 |
| JP | 2003-050589 A | 2/2003 |

OTHER PUBLICATIONS

Hillard, J. "Notes on how phrase and delay distortions affect the quality of speech, music and sound effects", IEEE Transactions on Audio, Mar. 1964, vol. 12, Issue:2, part 1 pp. 23-25.

Hsieh et al. "On Using the Ad-Hoc Network Model in Cellular Packet Data Networks", International Symposium on Mobile Ad-Hoc Networking Computing, The 3$^{rd}$ ACM, ACM Jun. 9-11, 2002, pp. 36-47.

Roychoudhuri et al. "Topology Discovery in Ad-Hoc Wireless Networks Using Mobile Agents", MATA 2000, LNCS pp. 1-15, Springer-Verlang Berlin, Heidelberg, Germany 2000.

* cited by examiner

F I G. 1
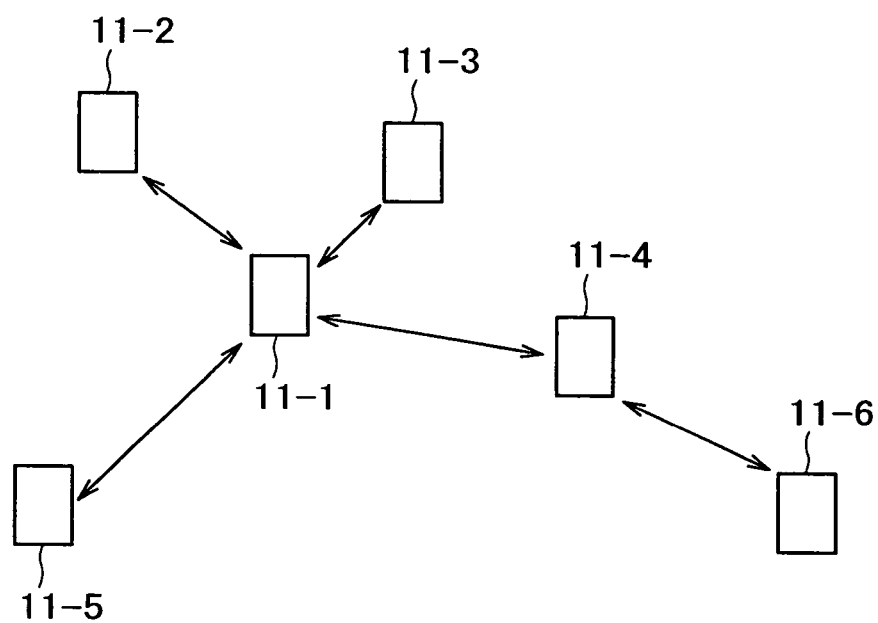

F I G. 5

| RECOMMENDATION | TITLE | ARTIST NAME | REPRODUCTION TIME | MUSIC DATA |
|---|---|---|---|---|
|  | TUNE b | BB | 2:45 | b. WAVE |
|  | TUNE c | CC | 3:50 | c. WAVE |

F I G. 6

| RECOMMENDATION | TITLE | ARTIST NAME | REPRODUCTION TIME | MUSIC DATA |
|---|---|---|---|---|
| ○ | TUNE b | BB | 2:45 | b. WAVE |
|  | TUNE c | CC | 3:50 | c. WAVE |

F I G. 7

| TITLE | ARTIST NAME | REPRODUCTION TIME | MUSIC DATA |
|---|---|---|---|
| TUNE b | BB | 2:45 | b. MP3 |

FIG. 10

| TITLE | ARTIST NAME | REPRODUCTION TIME | MUSIC DATA |
|---|---|---|---|
| TUNE a | AA | 5:10 | a.MP3 |
| TUNE b | DD | 4:55 | d.MP3 |

FIG. 11

| RECOMMENDATION | TITLE | ARTIST NAME | REPRODUCTION TIME | MUSIC DATA | RECOMMENDING USER COUNT |
|---|---|---|---|---|---|
| | TUNE a | AA | 5:10 | a.MP3 | 1 |
| | TUNE b | BB | 2:45 | b.MP3 | 1 |
| | TUNE d | DD | 4:55 | d.MP3 | 1 |

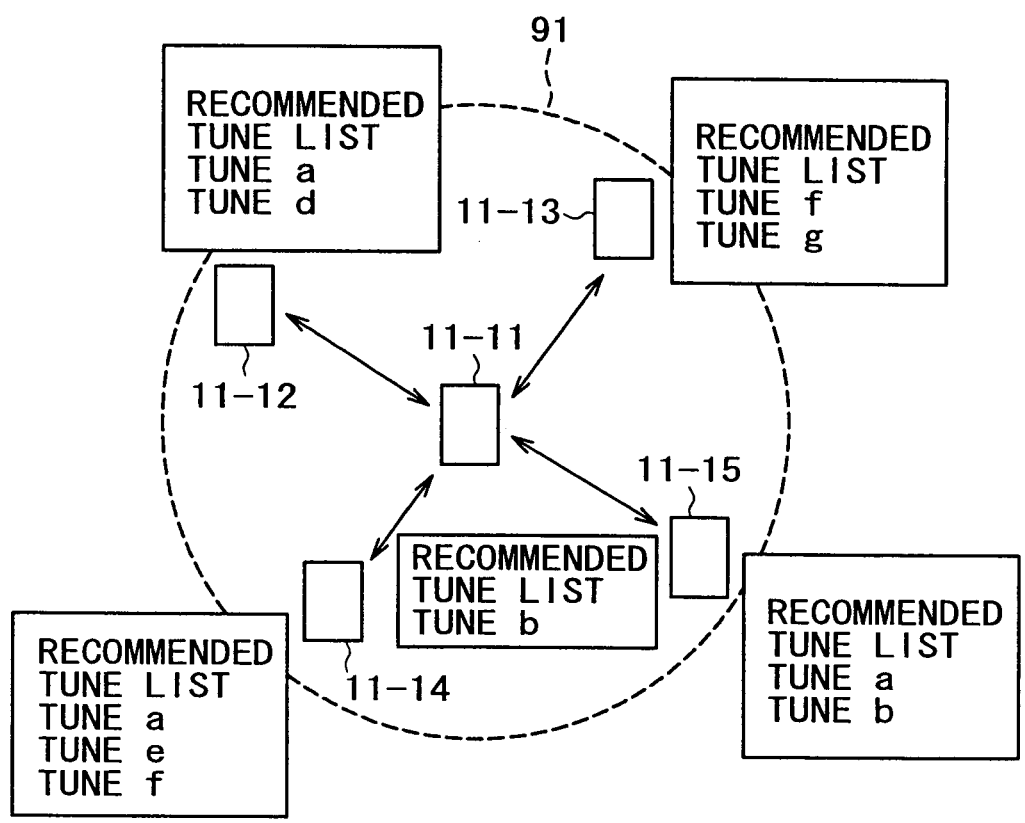
F I G. 1 3

FIG. 14

| RECOMMENDATION | TITLE | ARTIST NAME | REPRODUCTION TIME | MUSIC DATA | RECOMMENDING USER COUNT |
|---|---|---|---|---|---|
| | TUNE a | — | — | — | 3 |
| | TUNE b | — | — | — | 2 |
| | TUNE d | — | — | — | 1 |
| | TUNE e | — | — | — | 1 |
| | TUNE f | — | — | — | 2 |

FIG. 16

| RECOMMENDATION | TITLE | ARTIST NAME | REPRODUCTION TIME | MUSIC DATA | RECOMMENDING USER COUNT |
|---|---|---|---|---|---|
| ○ | TUNE a | — | — | — | 3 |
| ○ | TUNE b | — | — | — | 2 |
|  | TUNE d | — | — | — | 1 |
| ○ | TUNE e | — | — | — | 1 |
|  | TUNE f | — | — | — | 2 |

F I G. 1 7
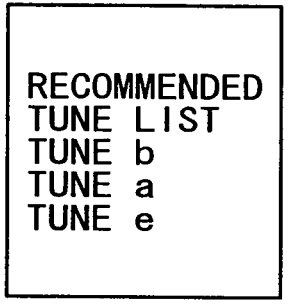

F I G. 1 8
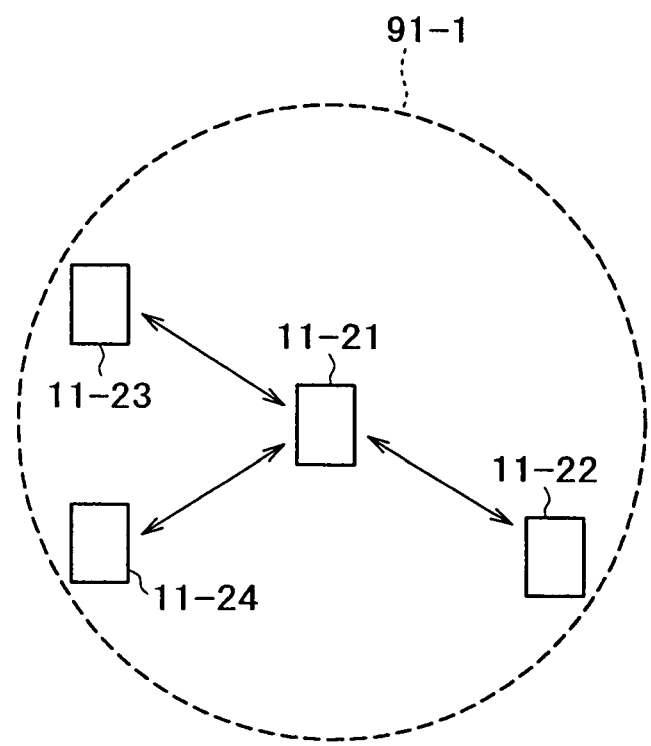

F I G. 2 1
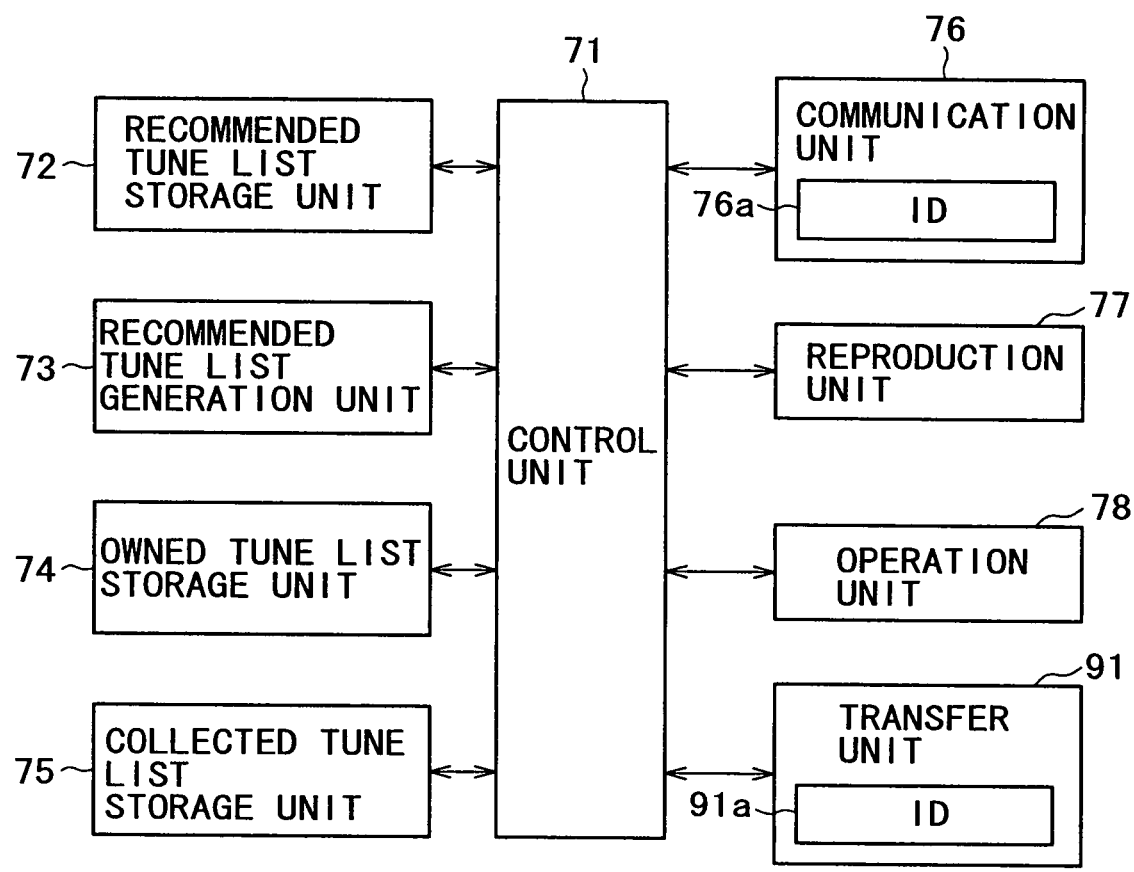

F I G. 2 4
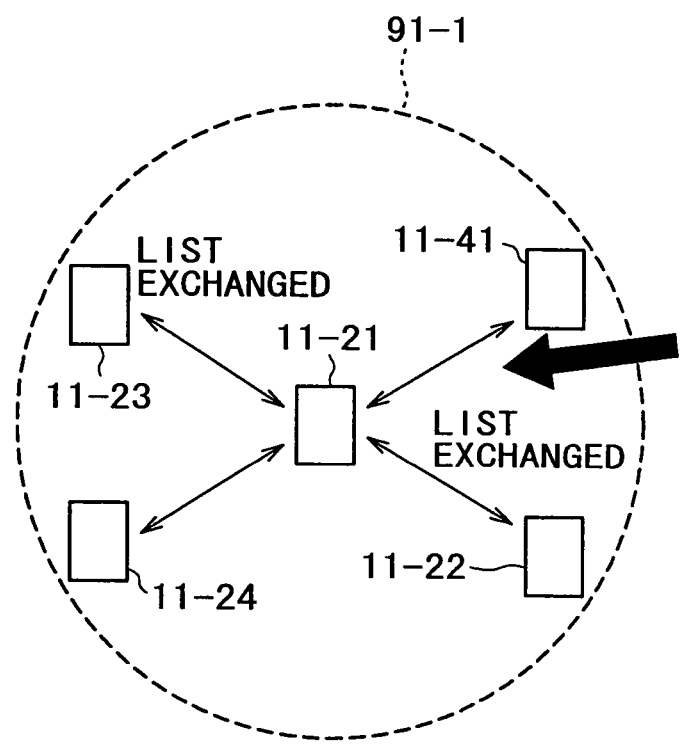

SYSTEM, METHOD AND APPARATUS ENABLING EXCHANGE OF LIST OF CONTENT DATA ITEMS

RELATED CASE INFORMATION

This application is a continuation of application Ser. No. 10/624,304, filed Jul. 22, 2003, which claims priority to Japanese Application No. JP2002-212661, filed Jul. 22, 2002.

BACKGROUND OF THE INVENTION

The present invention relates to a data processing apparatus, a data processing method, a data processing system, a storage medium, and a program. More particularly, the invention relates to a data processing apparatus, a data processing method, a data processing system, a storage medium, and a program for allowing favored pieces of music to be selected easily.

There exist countless pieces of music to choose from today. It is understandable that for those who love music, selecting their favorite tunes is not an easy task.

One way of selecting preferred music titles efficiently is by listening to so-called request programs on the radio. The request program typically broadcasts the pieces of music requested by large numbers of users (i.e., listeners who love music). Listening to the program offering the requested music allows users to know the latest releases and the tunes currently supported by numerous people making their requests. By referring to such information about the current music scene, users can select their favorite pieces of music from the latest pool of available tunes.

One disadvantage of the conventional method above for music selection is that it requires a high level of user involvement: many users must take the trouble to request their favorite music titles, which can be a considerable burden on the users' resources.

Another disadvantage is that while the request program is on the air, the users must listen to an entire tune that happens to be playing regardless of whether they like listening to it until its end. The users are unable to stop listening to the currently-playing piece of music that is not their favorite as long as the program is on the air.

A further disadvantage is the limited number of tunes that may be aired within the limited time frame of the request program. For the users, the number of music titles that can be listened to is, say, 20 at the most on a typical one-hour request program.

Another method for tune selection has been proposed whereby users are asked to register their favorite genres of music with a music content provider so that only the tunes of the preferred category will be delivered to the registered users. Yet another method involves the content provider estimating each user's favorite pieces of music based on the user's past records (of selected or reproduced tunes) before proposing or delivering the presumed tunes to the user. Where they are asked to register their preferences, the users must take the trouble to define and enter the favored genres of music, which can be a tiresome chore from the users' point of view. Once a given genre is specified, only the tunes that fall within that category are selected; the users find it difficult to choose tunes from any other category even if an out-of-genre selection is desired. Where the users' past records are used as a basis for estimating their favorite tunes, the earlier records will prevent tunes of any new category from being selected, which can inordinately limit the users' scope of selections. Furthermore, registering the users' preferences or their past records requires installing a dedicated server, which can be costly given the need for its maintenance and other cost-related factors.

SUMMARY OF THE INVENTION

The present invention has been made in view of the above circumstances and provides a data processing apparatus, a data processing method, a data processing system, a storage medium, and a program for allowing users efficiently to choose their favored pieces of music free from the constraints of any specific genre and without recourse to a dedicated server.

In carrying out the invention and according to a first aspect thereof, there is provided a data processing apparatus including: a reproducing element for reproducing each of a plurality of content data items; a reproduction status detecting element for detecting status of each content data item being reproduced by the reproducing element; a selecting element for selecting the content data item being reproduced by the reproducing element depending on the reproduction status of the content data item detected by the reproduction status detecting element; a content identification data generating element for generating content identification data for identifying the content data item selected by the selecting element from the plurality of content data items; and a transmitting element for transmitting to a second data processing apparatus the content identification data generated by the content identification data generating element.

According to a second aspect of the invention, there is provided a data processing apparatus including: a reproducing element for reproducing each of a plurality of content data items; an operating element for designating selection of the content data item being reproduced by the reproducing element; a content identification data generating element which, if the operating element is operated for the designation while the content data item is being reproduced by the reproducing element, then generates content identification data for identifying the currently reproduced content data item from among the plurality of content data items; and a transmitting element for transmitting to a second data processing apparatus the content identification data generated by the content identification data generating element.

According to a third aspect of the invention, there is provided a data processing method for use with a data processing apparatus, the method including the steps of: reproducing each of a plurality of content data items; detecting status of each content data item being reproduced; selecting the content data item being reproduced depending on the detected reproduction status of the content data item; generating content identification data for identifying the content data item selected from the plurality of content data items; and transmitting the content identification data to a second data processing apparatus.

According to a fourth aspect of the invention, there is provided a program for use with a data processing apparatus, the program including the steps of: reproducing each of a plurality of content data items; detecting status of each content data item being reproduced; selecting the content data item being reproduced depending on the detected reproduction status of the content data item; generating content identification data for identifying the content data item selected from the plurality of content data items; and transmitting the content identification data to a second data processing apparatus.

According to a fifth aspect of the invention, there is provided a data processing apparatus including: a receiving element for receiving a plurality of content identification data items; a reproducing element for reproducing a content data item identified by each of the content identification data items received by the receiving element; a reproduction status detecting element for detecting status of each content data item being reproduced by the reproducing element; and a selecting element for selecting the content data item identified by any one of the plurality of content identification data items and reproduced by the reproducing element, depending on the reproduction status of the content data item detected by the reproduction status detecting element.

According to a sixth aspect of the invention, there is provided a data processing method including the steps of: receiving a plurality of content identification data items; reproducing a content data item identified by each of the content identification data items received; detecting status of each content data item being reproduced; and selecting the content data item being reproduced depending on the detected reproduction status of the content data item.

According to a seventh aspect of the invention, there is provided a program including the steps of: receiving a plurality of content identification data items; reproducing a content data item identified by each of the content identification data items received; detecting status of each content data item being reproduced; and selecting the content data item being reproduced depending on the detected reproduction status of the content data item.

According to an eighth aspect of the invention, there is provided a data processing system having a first and a second data processing apparatus; wherein the first data processing apparatus includes: a first reproducing element for reproducing each of a plurality of content data items; a first reproduction status detecting element for detecting status of each content data item being reproduced by the first reproducing element; a first selecting element for selecting the content data item being reproduced by the first reproducing element depending on the reproduction status of the content data item detected by the first reproduction status detecting element; a content identification data generating element for generating content identification data for identifying the content data item selected by the first selecting element from the plurality of content data items; and a transmitting element for externally transmitting the content identification data; and wherein the second data processing apparatus includes: a receiving element for receiving the content identification data from the first data processing apparatus; a second reproducing element for reproducing the content data item identified by the content identification data received by the receiving element; a second reproduction status detecting element for detecting status of the content data item being reproduced by the second reproducing element; and a second selecting element for selecting the content data item being reproduced by the second reproducing element depending on the reproduction status of the content data item detected by the second reproduction status detecting element.

Accordingly, the inventive scheme helps reduce server-related costs while decreasing line congestions on the server resources. Given the tunes recommended by other users, each user's range of music selection can be expanded free from the user's traditionally preferred category of music. Other users' recommended tunes alleviate the burden on the user in finding criteria for selecting tunes. Each user is able to know the currently popular tunes in real time thanks to the recently recommended tunes from others. It is also possible for users to select favorite tunes according to local conditions in the proximity.

Other objects, features and advantages of the present invention will become more apparent in the following specification and accompanying drawings.

BRIEF DESCRIPTION OF THE DRAWINGS

FIG. 1 is a block diagram showing a typical configuration of a tune recommendation system according to the invention;

FIG. 5 is an explanatory view of an owned tune list;

FIG. 6 is an explanatory view of another owned tune list;

FIG. 7 is an explanatory view of a recommended tune list;

FIG. 10 is an explanatory view of another recommended tune list;

FIG. 11 is an explanatory view of a collected tune list;

FIG. 13 is an explanatory view illustrating how a collected tune list is generated;

FIG. 14 is an explanatory view of another collected tune list;

FIG. 16 is an explanatory view of another collected tune list;

FIG. 17 is an explanatory view of another recommended tune list;

FIG. 18 is an explanatory view outlining the collected tune list generating process;

FIG. 21 is a function block diagram depicting other functions implemented by the portable terminal of FIG. 2;

FIG. 24 is an explanatory view illustrating how a collected tune list is generated.

DETAILED DESCRIPTION OF THE PREFERRED EMBODIMENTS

Figure 2:
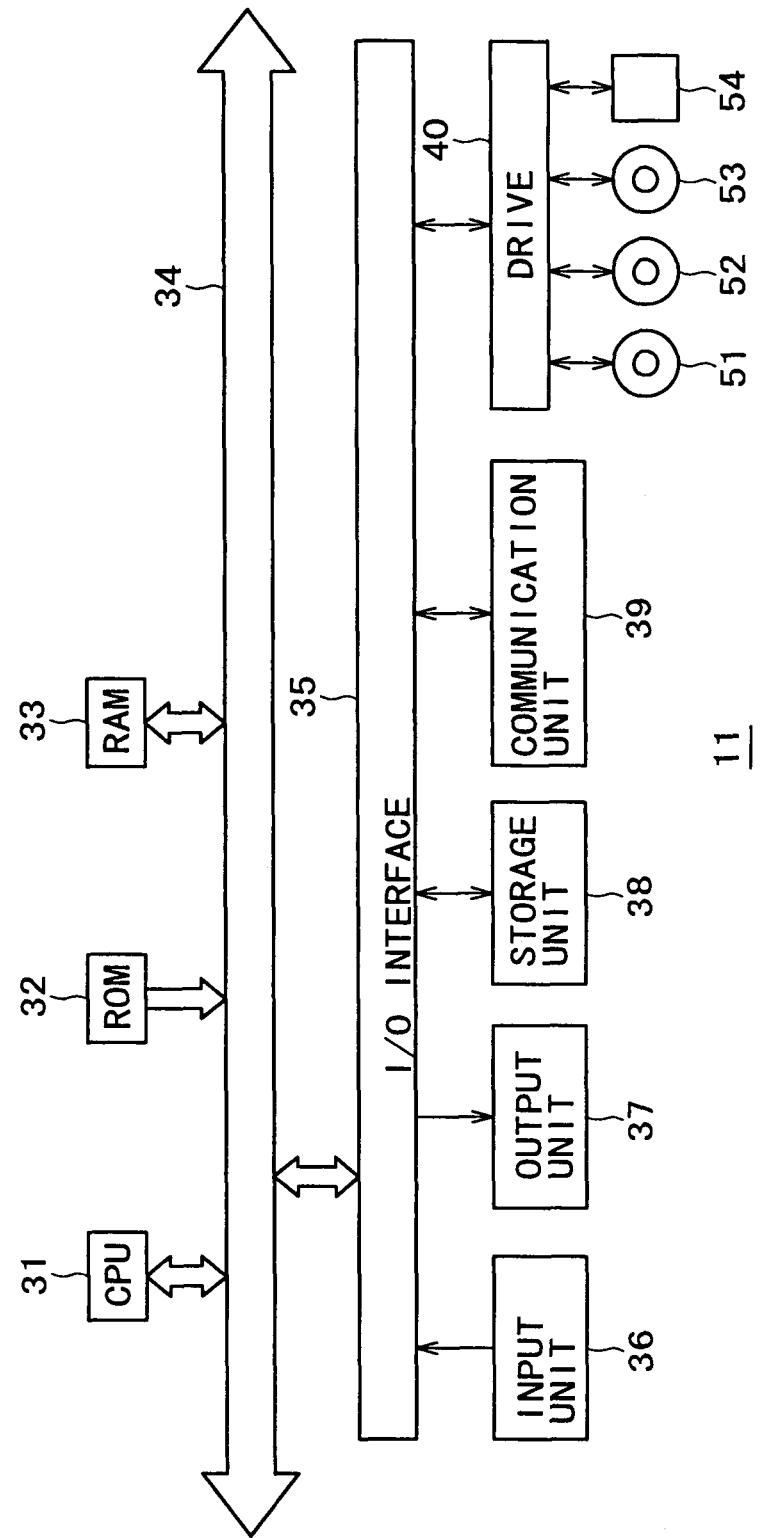
FIG. 2 is a block diagram depicting a typical structure of a portable terminal included in FIG. 1.

FIG. 1 is a block diagram showing a typical configuration of a tune recommendation system embodying this invention. In FIG. 1, portable terminals 11-1 through 11-6 are illustratively so-called PDAs (personal digital assistants). In the description that follows, these terminals will be generically referred to as the portable terminal 11 if there is no specific need for distinction therebetween. The same generic reference will also apply to other components that may each be furnished in a plurality of units.

The portable terminals 11-1 through 11-6 are capable of reproducing tunes upon receipt of instructions from their respective users. Each portable terminal detects the status of each tune being reproduced in order to generate a recommended tune list based on the reproduction status of the tunes. Each of the portable terminals 11-1 through 11-6 can exchange recommended tune lists with another portable terminal 11 that has entered a proximate range where communication is possible between the two. In the setup of FIG. 1, the portable terminal 11-1 may exchange recommended tune lists with any one of the portable terminals 11-2 through 11-5. A recommended tune list of the portable terminal 11-6 beyond the communicating range of the terminal 11-1 may be first transferred to the communicable terminal 11-4 nearby before being passed on from there to the terminal 11-1. In this manner, the portable terminal 11-1 may acquire recommended tune lists from the nearby terminals 11-2 through 11-6 illustratively as a result of the terminal users' tune reproducing operations. The user of the portable terminal 11-1 is then able to know the currently popular tunes from the recommended tune lists reflecting the preferences of the other users in the proximity. The exchanged lists provide reference information which allows the users to select their favorite tunes.

A typical structure of the portable terminal 11 will now be described with reference to FIG. 2. A CPU (central processing unit) 31 performs various processes in accordance with programs held in a ROM (read only memory) 32 or a storage unit 38. A RAM (random access memory) 33 accommodates as needed the programs and data being executed by the CPU 31. The CPU 31, ROM 32, and RAM 33 are interconnected by means of a bus 34.

The CPU 31 is connected to an I/O interface 35 via the bus 34. The I/O interface 35 is connected to an input unit 36 and an output unit 37. The input unit 36 is illustratively constituted by a keyboard, mouse and a microphone, and the output unit 37 by a display and a speaker. The CPU 31 performs various processes in response to commands entered through the input unit 36, and outputs pictures and sounds resulting from the processes to the output unit 37.

The storage unit 38 connected to the I/O interface 35 is illustratively composed of a hard disc drive that stores the programs and data to be executed by the CPU 31. A communication unit 39 communicates with an external device such as another portable terminal 11 shown in FIG. 1.

The storage unit 38 holds diverse programs that may be retrieved and carried out by the CPU. The storage unit 38 also retains an OS (operating system) and various drivers. In addition to these programs, the storage unit 38 may hold programs that have been acquired through the communication unit 39.

A drive 40 connected to the I/O interface 35 accommodates a magnetic disc 51, an optical disc 52, a magneto-optical disc 53, or a semiconductor memory 54. In operation, the drive 40 drives any one of these storage media being loaded so as to acquire the programs and data recorded on the medium. The programs and data thus acquired are transferred as needed from the drive 40 to the storage unit 38 for storage.

Typical functions implemented by the portable terminal 11 of FIG. 2 will now be described with reference to the function block diagram of FIG. 3. In the description that follows, the function blocks of the terminal will be shown implemented by the CPU 31 executing preinstalled programs in the ROM 32. Alternatively, the function blocks may be implemented by appropriate hardware. This and other function block diagrams introduced hereunder may thus be regarded as either a hardware block diagram or a software block diagram each.

A control unit 71 controls the entire portable terminal 11 in operation. A recommended tune list storage unit 72 holds recommended tune lists. A recommended tune list is generated as follows: tunes stored in a owned tune list storage unit 74 or tunes stored in a collected tune list storage unit 75 are reproduced by turns by a reproduction unit 77 in response to the user's operation of an operation unit 78. With the tunes being reproduced, a recommended tune list generation unit 73 detects operation status of each tune and generates a recommended tune list in keeping with the operation status thus detected. More specifically, if a given tune has been reproduced longer than a predetermined time period, or if the tune is designated by the user as a recommended tune (e.g., selected as part of "My Favorites," to be described later), then the tune in question is regarded as one of the user's preferred tunes and included in the recommended tune list that is stored into the recommended tune list storage unit 72.

The recommended tune list generation unit 73 generates the recommended tune list as described before storing it into the recommended tune list storage unit 72. In view of the expected distribution of tunes and the copyrights involved, the music data constituting the tunes in the recommended tune list are recorded only partially, or the music data are submitted to low-bit rate processing before being recorded. In order to reduce the communication load on the communication unit 76, the recommended tune list generation unit 73 compresses the music data using a predetermined compression method (e.g., MP3 (Moving Picture Experts Group 1 Layer 3)). In addition, the recommended tune list generation unit 73 compares its own collected tune list with a recommended tune list sent from another portable terminal 11. Of the tunes constituting the recommended tune list received, those not found in the comparing terminal's own collected tune list are co-opted into the own list that is placed into the collected tune list storage unit 75 for storage. For each of the recommended tunes that already exist in the own collected tune list, a recommending user counter representing the number of recommending users of other portable terminals 11 is incremented by one. Repeating these steps permits accumulation of information about the tunes currently supported by a large number of people. The accumulated information serves as the reference according to which the users can select their favored tunes.

An owned tune list storage unit 74 stores an owned tune list composed of the tunes currently owned by and stored in the portable terminal 11. The owned tune list typically includes an artist name, a title, a reproduction time period, and music data about each of the tunes stored in the terminal 11. These tunes are derived from broadcasts (over the radio and/or TV), from the storage medium purchased by the terminal user (e.g., CD (Compact Disc) or MD (Mini Disc; registered trademark)), or from deliveries by an EMD (Electrical Music Distribution) server that distributes music data along with tune-related information (e.g., music titles and restrictions on reproduction) over a network such as the Internet (not shown) in response to requests from the portable terminals 11.

The collected tune list storage unit 75 accommodates not only the portable terminal's own recommended tune list but also the lists of recommended tunes received from other portable terminals 11.

The communication unit 76 is implemented by a program that controls the communication unit 39 shown included in FIG. 2. The program has its own ID 76a held inside. In operation, the communication unit 76 transmits a search signal wirelessly to search for and detect another portable terminal 11 in the proximity. In response to the search signal, the nearby terminal 11 transmits its ID. On receiving the transmitted ID from the nearby terminal, the searching terminal sends its own ID 76a and establishes connection with the terminal in the proximity. The connection provides a short-range communication such as Bluetooth between portable terminals 11 sufficiently close to each other. Once the connection is established, the communication unit 76 transmits its own recommended tune list to the other portable terminal 11 and requests in exchange a recommended tune list generated by the latter terminal 11. The recommended tune list sent from the other portable terminal 11 is received and forwarded to the recommended tune list generation unit 73. The ID 76a mentioned above is illustratively equivalent to one of IP (Internet Protocol) addresses used over the Internet.

The reproduction unit 77 reproduces music data constituting various tunes under control of the control unit 71. If the music data are found to be compressed by a specific compression method, the data are decompressed by a suitable decompression method for reproduction.

The operation unit 78 outputs to the control unit 71 information reflecting the user's operations aimed at selecting a tune, at reproducing or stopping the selected tune, at selecting another tune, or at selecting the tune as part of "My Favorites". More specifically, selecting a tune as part of "My Favorites" involves first establishing a button for selecting a favorite tune and then clicking on the button to finalize the selection of the favorite tune. The tunes selected as part of "My Favorites" are the user's favorites which, distinct from the other tunes, are arranged to be readily selected and reproduced each by a simple operation of a predetermined button.

The owned tune list will now be described in more detail with reference to FIG. 5.

The owned tune list is a list that shows information about the tunes owned by this portable terminal 11. As shown in FIG. 5, the list carries, from left to right, recommendation information (indicated as "Recommendation"), a title, an artist name, a reproduction time, and music data (e.g., name of a file name containing the data constituting a tune) regarding each of the listed tunes. Shown in the example of FIG. 5 from the top down are "b" and "c" in the title column, "BB" and "CC" in the artist name column, "2:45" and "3:50" in the reproduction time column, and "b.WAVE" and "c.WAVE" in the music data column. The title "b" is shown associated with an artist named "BB", indicating the tune having the reproduction time period of two minutes, 45 seconds and held in a WAVE format file called "b.WAVE". The title "c" is shown associated with an artist named "CC", indicating the tune having the reproduction time period of three minutes, 50 seconds and held in a WAVE format file called "c.WAVE".

The recommendation information constitutes a column indicating that for example, given tune has been reproduced longer than a predetermined time period, or a given tune designated by the user as a recommended tune (e.g., selected as part of "My Favorites") is considered one of the user's preferred tunes and thus placed into a recommended tune list. Illustratively, if the tune "b" is selected as a recommended tune, a circle "○" is marked in the corresponding field of the recommendation information column, as shown in FIG. 6. Based on this recommendation information, the recommended tune list generation unit 73 generates a recommended tune list as depicted in FIG. 7. That is, as with the owned tune list, the recommended tune list is constituted by a title, an artist name, a reproduction time, and music data regarding each of the listed tunes. When the recommended tune list is generated, the music data constituting the listed tunes are compressed before being written to the list. In the example of FIG. 7, the music data are described as "b.MP3" indicating that the WAVE format file named "b.WAVE" has been compressed by the MP3 method.

Figure 8:
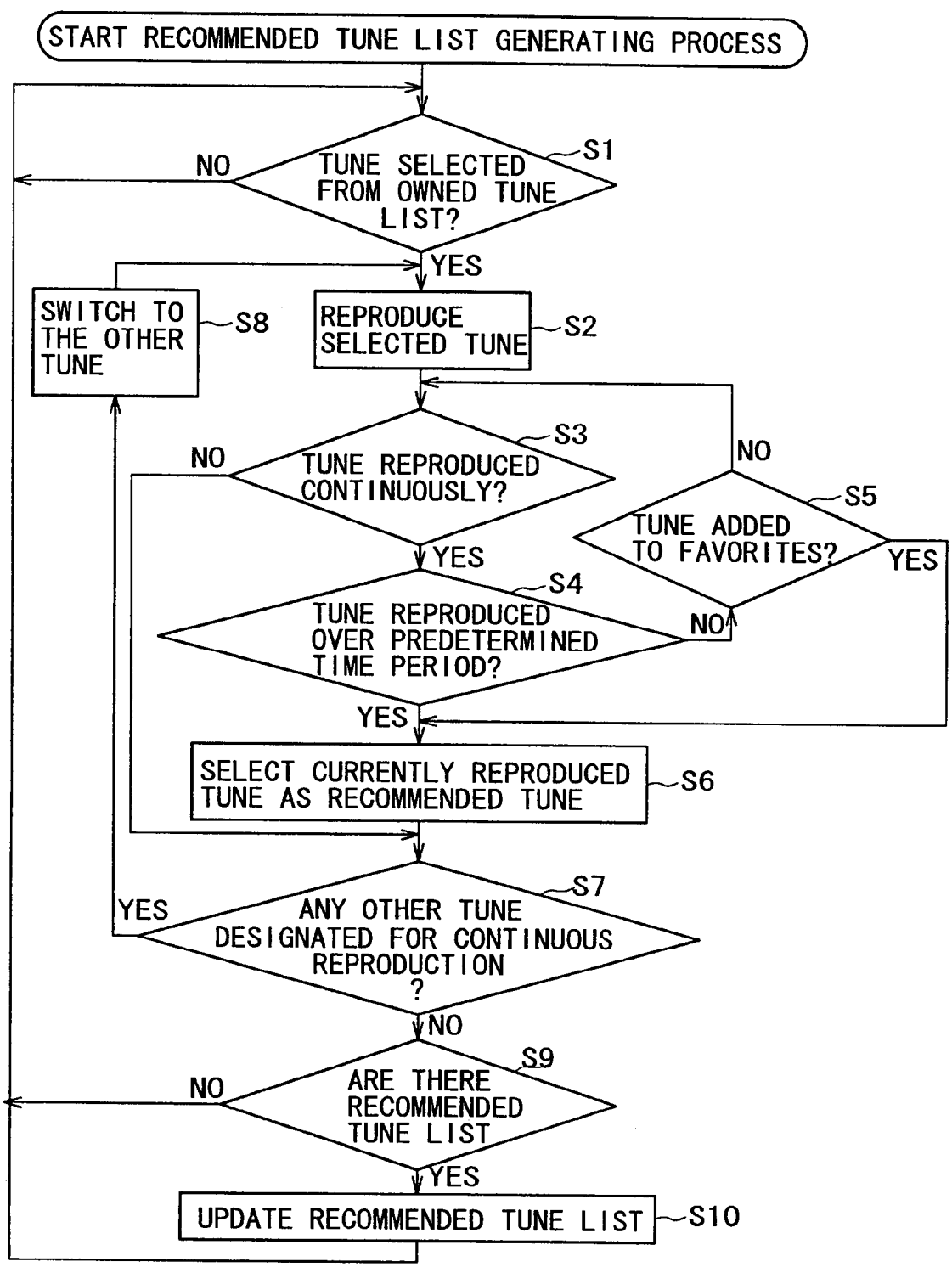
FIG. 8 is a flowchart of steps constituting a recommended tune list generating process.

A recommended tune list generating process will now be described with reference to the flowchart of FIG. 8. In step S1, the control unit 71 determines whether any tune targeted for reproduction is selected from the owned tune list by the user operating the operation unit 78. The step is repeated until the target tune is selected. For example, if the tune "b" is selected for reproduction from the owned tune list of FIG. 5, the control unit 71 goes to step S2 and reads from the owned tune list the file "b.WAVE" containing the music data constituting the tune "b". The retrieved file is fed to the reproduction unit 77 for reproduction.

In step S3, the control unit 71 determines whether reproduction of the tune is continued, with no intervention from the user operating the operation unit 78 to stop or change the currently playing tune. If the reproduction is found to continue, step S4 is reached.

In step S4, the control unit 71 determines whether the reproduction has lasted a predetermined time period. If the reproduction has yet to last the predetermined time period, step S5 is reached.

In step S5, the control unit 71 determines whether the currently selected tune is added to "My Favorites" by the user operating the operation unit 78. Illustratively, if the tune is not selected as a favorite tune, step S3 is reached again. In other words, as long as the current state of reproduction is continued without the tune getting selected as a favorite tune, steps S3 through S5 are repeated.

If it is determined that the reproduction has lasted the predetermined time period in step S4 or that a suitable button is clicked on to add the currently selected tune to "My Favorites" in step S5, then step S6 is reached. In step S6, the recommended tune list generation unit 73 selects the currently reproduced tune as a recommended tune by marking a circle "○" denoting recommendation in the applicable field of the recommendation information column in the owned tune list held in the owned tune list storage unit 74, as shown in FIG. 6.

In step S7, the control unit 71 determines whether any other tune is designated for continuous reproduction. If it is determined that a tune has been selected for continuous reproduction, step S8 is reached. In step S8, the control unit 71 reads the tune in question from the owned tune list storage unit 74 and outputs the retrieved tune to the reproduction unit 77. In this example, the tune "c" is selected from the owned tune list for continuous reproduction. That is, the file "c.WAVE" is retrieved and the steps subsequent to step S2 are repeated.

If it is determined in step S7 that no other tune is designated for reproduction, then step S9 is reached. In step S9, the recommended tune list generation unit 73 references the owned tune list to determine whether any recommended tune exists. In this example, the tune "b" has been selected as a recommended tune, so that step S10 is reached. In step S10 the recommended tune list generation unit 73 converts the music data constituting the selected tune "b" to a data format free from copyright infringement, illustratively by subjecting the music data to low-bit rate processing or by utilizing excerpts of the tune. After the conversion, the WAVE format file is compressed by the MP3 method and the recommended tune list is updated as indicated in FIG. 7 (if no recommended tune list exists, a new recommended tune list is generated). The recommended tune list thus updated is placed into the recommended tune list storage unit 72 for storage.

If it is determined in step S3 that the reproduction is discontinued, then steps S4 through S6 are skipped.

If it is determined in step S9 that no recommended tune exists, step S10 is skipped. In this case, the recommended tune list is not updated.

With the above steps carried out, the recommended tune list is gradually generated while the user is simply reproducing, stopping, or changing tunes; the user need not become aware of any list-generating process. In the example above, the currently selected tune was shown entered into the recommended tune list if the tune had been reproduced for a predetermined period of time or if the tune was selected as a favorite tune. Alternatively, the tune may be written to the recommended tune list if a certain part of the tune is reproduced, if the tune has been reproduced from beginning to end, or if the tune is reproduced again after being rewound. As another alternative, the recommended tune list may include a reproduction time of day and a reproduction count regarding each of the listed tunes.

Figure 9:
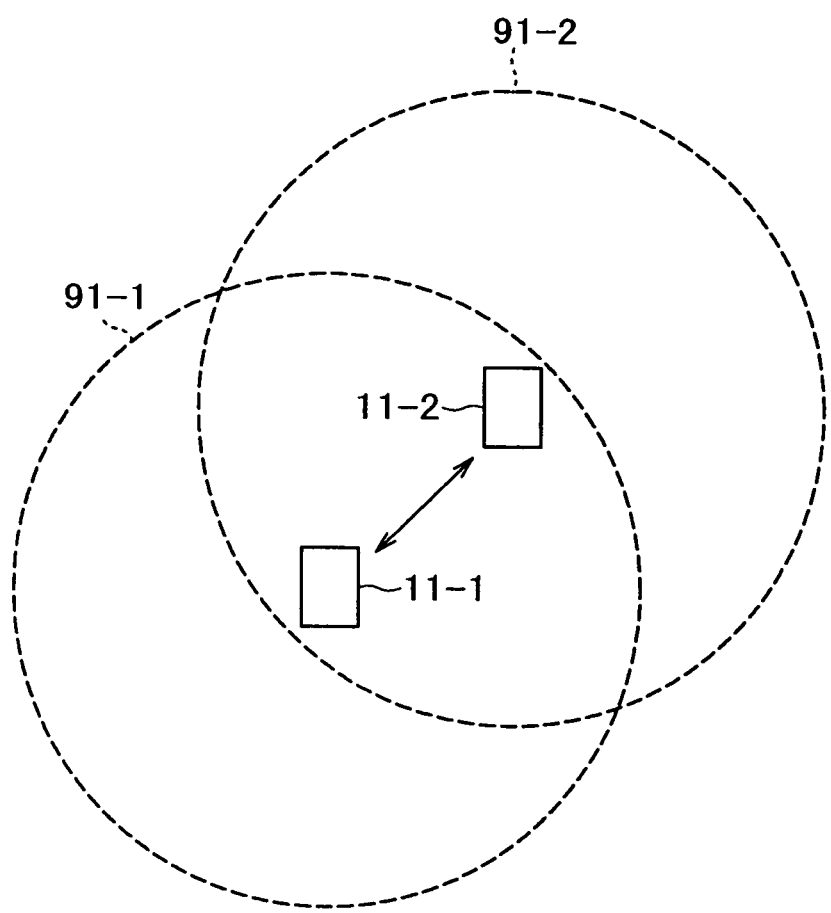
FIG. 9 is an explanatory view outlining how recommended tune lists are exchanged.

Described below is how a collected tune list is generated through exchanges between portable terminals 11 of their recommended tune lists generated in the above-described steps. Illustratively, when two portable terminals 11 come into a mutually communicable range as shown in FIG. 9, the terminals start communicating with each other and exchange their recommended tune lists. Given the other terminal's recommended tune list, each terminal 11 generates a collected tune list accordingly. In the setup of FIG. 9, an area 91-1 stands for a communicable range of the portable terminal 11-1 and an area 91-2 for a communicable range of the portable terminal 11-2.

When the situation in FIG. 9 takes place, each of the portable terminals 11 recognizes the presence of the other terminal and starts communicating therewith.

Illustratively, the portable terminal 11-1 sends the recommended tune list of FIG. 7 to the terminal 11-2 while the terminal 11-2 transmits the recommended tune list of FIG. 10 to the terminal 11-1. In that case, the portable terminals 11-1 and 11-2 each generate a collected tune list such as that shown in FIG. 11.

More specifically, the recommended tune list sent from the portable terminal 11-2 to the terminal 11-1 includes the tune "a" and tune "d" in the title column, "AA" and "DD" in the artist name column, "5:10" and "4:55" in the reproduction time column, and "a.MP3" and "d.MP3" in the music data column, listed from the top down as shown in FIG. 10. The list indicates that the tunes "a" and "d" selected as recommended tunes are associated with the artists named "AA" and "DD", have reproduction times of five minutes, 10 seconds and four minutes, 55 seconds, and are held in the files "a.MP3" and "d.MP3," respectively.

The two portable terminals 11 exchange their recommended tune lists, one in FIG. 7 and the other in FIG. 10, and merge them into the collected tune list in FIG. 11. In the list of FIG. 11, the tunes are associated with recommendation information fields which may again be marked as desired by each of the terminals 11-1 and 11-2 to generate a new recommended tune list. Each listed tune is furnished with the recommending user counter. When any one of the tunes in the terminal's own recommended tune list is found to exist in the recommended tune list received from another portable terminal 11, the recommending user counter denoting the number of users recommending the tune in question is incremented by one. In the example of FIG. 11, the tunes "a" through "c" have a recommending user count of one each.

Figure 12:
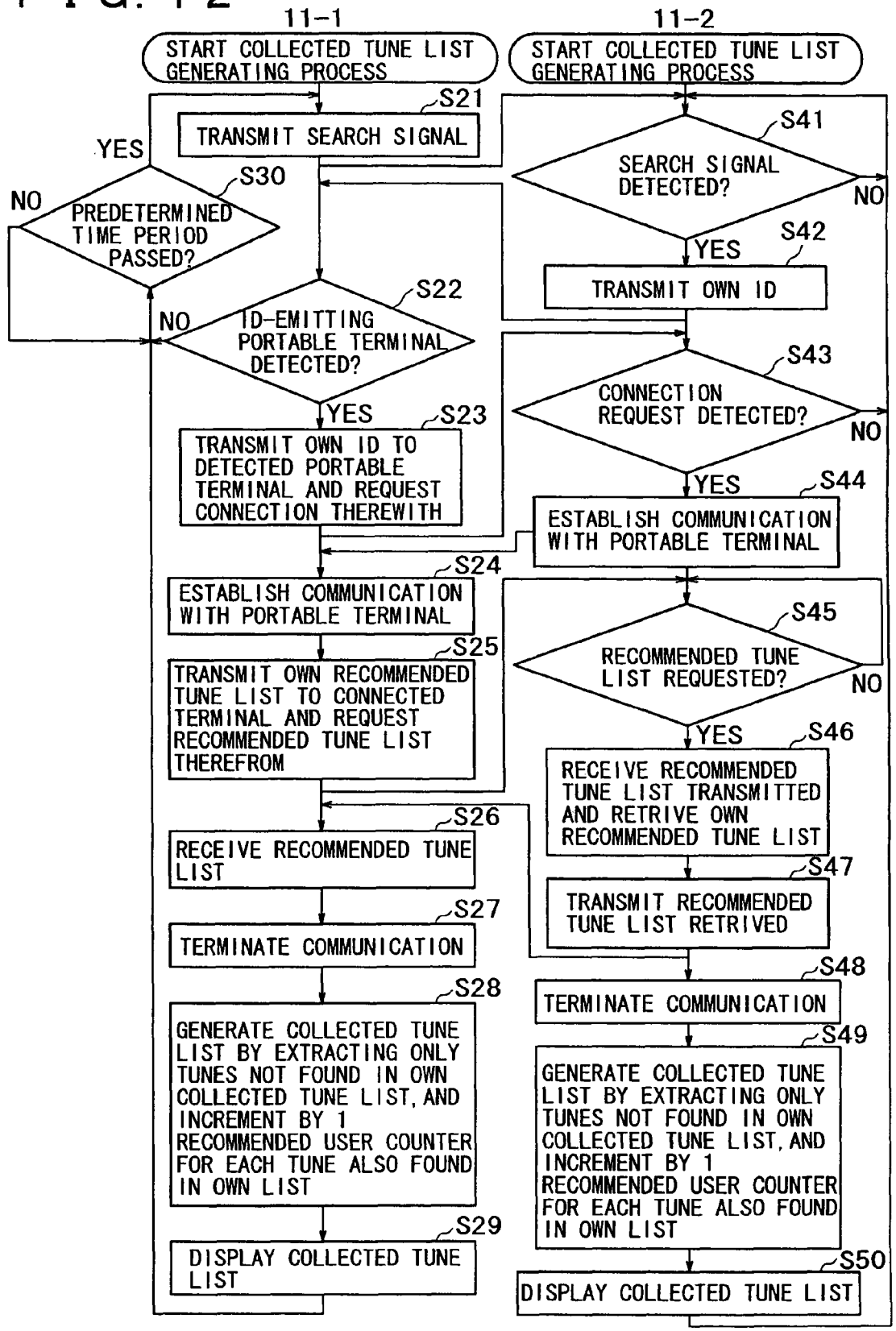
FIG. 12 is a flowchart of steps constituting a collected tune list generating process.

Described below with reference to the flowchart of FIG. 12 is a collected tune list generating process performed by the portable terminals 11-1 and 11-2.

In step S21, the control unit 71 of the portable terminal 11-1 transmits a search signal through the communication unit 76. In step S22, the control unit 71 determines whether there exists a portable terminal 11-2 emitting a signal bearing an ID of 76*a*-2 (it is assumed hereunder that the terminals 11-1 and 11-2 have IDs 76*a*-1 and 76*a*-2 respectively).

In step S41, the communication unit 76 of the portable terminal 11-2 determines whether a search signal is detected. The step is repeated until the search signal has been detected. If it is determined that a transmitted search signal is detected in step S41, then step S42 is reached. In step S42, the communication unit 76 of the terminal 11-2 reads its own ID 76*a*-2 and sends out a signal bearing the ID wirelessly. In step S43, the communication unit 76 determines whether there is a connection request. Steps S41 through S43 are repeated until a connection request is detected.

If it is determined in step S22 that the ID 76*a*-2 is sent from the communication unit 76 of the portable terminal 11-2 in step S42, the control unit 71 of the terminal 11-1 recognizes the presence of the terminal 11-2 emitting the ID 76*a*-2. In that case, step S22 is followed by step S23.

In step S23, the control unit 71 of the portable terminal 11-1 transmits its own ID 76*a*-1 through the communication unit 76 in response to the detected ID 76*a*-2 of the portable terminal 11-2. In so doing, the control unit 71 of the terminal 11-1 requests establishment of a connection with the other terminal 11-2.

In step S43, the communication unit 76 of the portable terminal 11-2 determines that a connection request is made by the terminal 11-1. In step S44, the communication unit 76 of the terminal 11-2 establishes connection with the portable terminal 11-1 based on the ID 76*a*-1 sent from the communication unit 76 of the terminal 11-1.

In step S24, the communication unit 76 of the portable terminal 11-1 establishes connection with the communication unit 76 of the terminal 11-2 acting in step S44.

In step S25, the control unit 71 of the portable terminal 11-1 transmits its recommended tune list through the communication unit 76, and requests the terminal 11-2 to send its own recommended tune list.

In step S45, the control unit 71 of the portable terminal 11-2 determines whether a request for the recommended tune list is received through the communication unit 76 from the portable terminal 11-1. Step S45 is repeated until the request for the recommended tune list is received (the request is accompanied by the recommended tune list of the portable terminal 11-1). Illustratively, if the portable terminal 11-1 requests the recommended tune list in step S25, then it is determined in step S45 that the request has been made. In that case, step S46 is reached in which the control unit 71 of the portable terminal 11-2 receives the recommended tune list from the terminal 11-1, reads its own recommended tune list from the recommended tune list storage unit 72, and forwards the retrieved list to the communication unit 76. In step S47, the communication unit 76 transmits the retrieved recommended tune list of the portable terminal 11-2 to the terminal 11-1. In step S48, the communication unit 76 of the terminal 11-2 ends the communication process.

In step S26, the control unit 71 of the portable terminal 11-1 receives through the communication unit 76 the recommended tune list of the terminal 11-2 sent therefrom in step S47, and places the received list into the collected tune list storage unit 75 for storage. In step S27, the control unit 71 of the portable terminal 11-1 causes the communication unit 76 to end communication with the terminal 11-2 in conjunction with the process of step S48.

In step S28, the recommended tune list generation unit 73 of the portable terminal 11-1 compares the collected tune list in its own collected tune list storage unit 75 with the recommended tune list received from the terminal 11-2. Of the tunes in the recommended tune list received, those not found in the terminal's own collected tune list are extracted and written to the collected tune list. And of the tunes in the recommended tune list, those found in the own collected tune list have their corresponding recommending user counters incremented by one each (a tune newly added to the collected tune list has an initial value of "1" set on the corresponding recommending user count). The collected tune list thus generated is stored into the collected tune list storage unit 75. Initially, the portable terminal 11-1 does not have any collected tune list. In that case, a collected tune list is generated by making a copy of the owned tune list before the comparison is made with the recommended tune list received from the portable terminal 11-2. (When the owned tune list are copied in order to generate the collected tune list, the music data involved are compressed by a predetermined method (in this case, compressed from the WAVE file format to the MP3 file format)).

In step S29, the control unit 71 of the portable terminal 11-1 reads the collected tune list from the collected tune list storage unit 75 and displays the retrieved list illustratively on a display unit. In step S30, the control unit 71 of the terminal 11-1 determines whether a predetermined time period has elapsed. This step is repeated until the predetermined time period is found to have elapsed. From step S30, control is returned to step S21. That is, steps S21 through S30 are repeated at intervals of the predetermined time period.

In the case above, as shown in FIG. 7, the recommended tune list of the portable terminal 11-1 contains only the tune "b" while the recommended tune list received from the terminal 11-2 includes the tunes "a" and "d". As a result, a collected tune list containing the tunes "a", "b" and "d" is generated as shown in FIG. 11, each of the tunes having a recommending user count of one each.

In step S49, as in step S28, the recommended tune list generation unit 73 of the portable terminal 11-2 compares the collected tune list in its own collected tune list storage unit 75 with the recommended tune list received from the terminal 11-1. Of the tunes in the recommended tune list received, those not found in the terminal's own collected tune list are extracted and written to the collected tune list. And of the tunes in the recommended tune list, those found in the own collected tune list have their corresponding recommending user counters incremented by one each (a tune newly added to the collected tune list has an initial value of "1" set on the corresponding recommending user count). The collected tune list thus generated is stored into the collected tune list storage unit 75.

In step S50, the control unit 71 of the portable terminal 11-2 reads the collected tune list from the collected tune list storage unit 75 and displays the retrieved list illustratively on the display unit. From step S50, control is returned to step S41.

In this case, as shown in FIG. 10, the recommended tune list of the portable terminal 11-2 contains the tunes "a" and "d" while the recommended tune list received from the terminal 11-1 includes the tune "b". As a result, a collected tune list containing the tunes "a", "b" and "d" is generated as shown in FIG. 11, each of the tunes having a recommending user count of one each. While the collected tune list is being displayed, the recommended tunes may be sorted by reproduction count, by reproduction time of day, or by reproduction time period.

The left-hand and right-hand columns of steps in the flowchart of FIG. 12 are both carried out by each portable terminal 11. The left-hand step column in FIG. 12 represents the process that is repeated at intervals of the predetermined time period, while the right-hand step column denotes the process that starts being executed when a search signal is received. Alternatively, the process represented by the left-hand step column in FIG. 12 may be started on the initiative of the user operating the operation unit 78 of the portable terminal 11.

Suppose that as shown in FIG. 13, a plurality of portable terminals 11-12 through 11-15 exist within an area 91, a communicable range of a portable terminal 11-11, and that the terminal 11-1 has a recommended tune list with the tune "b", the terminal 11-2 has a recommended tune list with the tunes "a" and "d", the terminal 11-13 has a recommended tune list with tunes "f" and "g", the terminal 11-14 has a recommended tune list with the tunes "a", "e" and "f", and the terminal 11-15 has a recommended tune list with the tunes "a" and "b", the lists being stored in the recommended tune list storage units 72 of the respective terminals. In such a case, the portable terminal 11-11 acquires a collected tune list such as that shown in FIG. 14. The recommended tune lists shown in FIG. 13 indicate only the titles of the listed tunes. The collected tune list of FIG. 14 shows only the titles and recommended user counts of the listed tunes; artist names, reproduction times, and music data are not included.

As indicated, the portable terminal 11-11 accumulates information from the recommended tune lists coming from the terminals 11-11 through 11-15. In the collected tune list of FIG. 14, the tune "a" has a recommending user count of 3, recommended by the users of the terminals 11-12, 11-14 and 11-15; the tune "b" has a recommended user count of 2, recommended by the users of the own terminal 11-11 and terminal 11-15; the tune "d" has a recommending user count of 1, recommended by the user of the terminal 11-12; the tune "e" has a recommending user count of 1, recommended by the user of the terminal 11-14; and the tune "f" has a recommending user count of 2, recommended by the users of the terminals 11-13 and 11-14.

By looking up the collected tune list of FIG. 14, the user of the portable terminal 11-11 is able to know that the tune "a" is recommended by the largest number of users of nearby terminals (i.e., located close enough to communicate with the communication unit 76), followed by the tunes "b" and "f" with fewer recommending users.

Given such information from the collected tune list, the user will listen to the listed tunes for trial so as to create a new recommended tune list accordingly.

Figure 15:
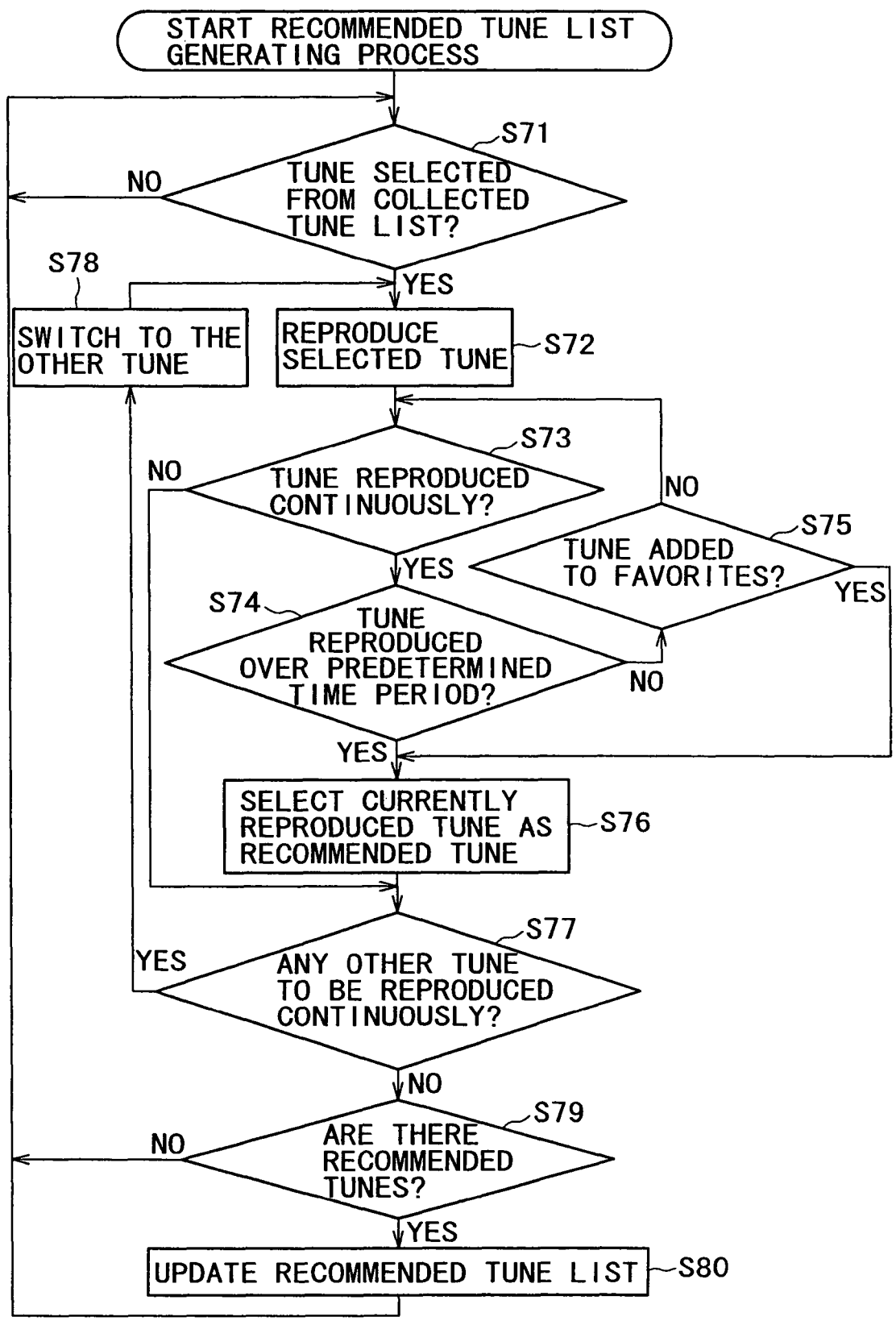
FIG. 15 is a flowchart of steps constituting a recommended tune list generating process.

Described below with reference to FIG. 15 is a typical process of generating a recommended tune list on the basis of the tunes in the collected tune list. In the flowchart of FIG. 15, steps S72 through S80 are equivalent to steps S2 through S10, respectively, in the flowchart of FIG. 8 and thus will not be described further.

In step S71, the control unit 71 determines whether any tune is selected from the collected tune list for reproduction by the user operating the operation unit 78. This step is repeated until the tune targeted for reproduction is found to be selected. Illustratively, if the tune "a" is selected for reproduction from the collected tune list of FIG. 14, control is passed from step S71 to step S72. In step S72, the target tune "a" is reproduced and subsequent steps are carried out.

Suppose now that the tunes "a", "b" and "e" are found to have been reproduced a predetermined time period (in step S74) or to have been added to "My Favorites" (in step S75). In such a case, step S76 is reached in which the selected tunes are each marked with a "○" symbol in the recommendation information column of the collected tune list as shown in FIG. 16. In step S80, a recommended tune list such as that in FIG. 17 is generated (in the list of FIG. 17, only the titles of the listed tunes are shown). Based on the recommended tune list thus generated, the steps in the flowchart of FIG. 12 are carried out again. This makes it possible for the portable terminal 11 repeatedly to exchange the recommended tune lists with other terminals 11 in the proximity.

Figure 19:
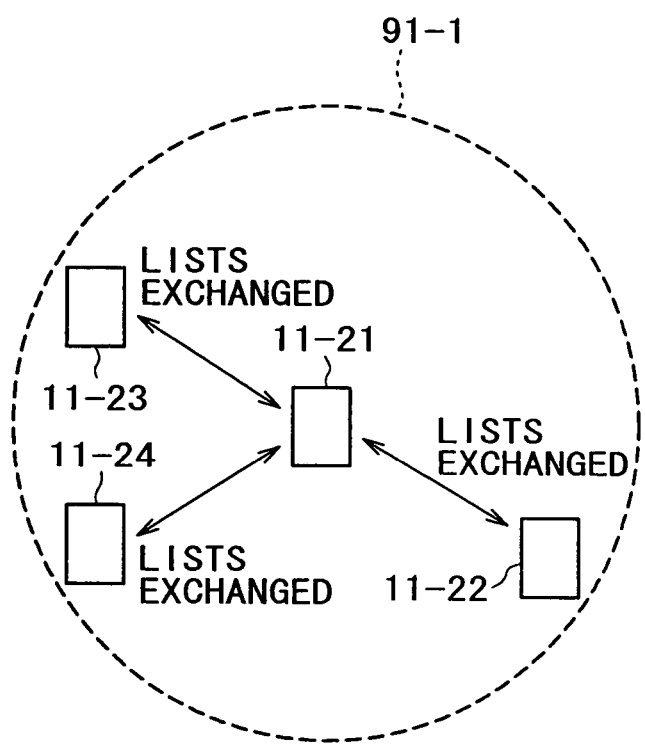
FIG. 19 is another explanatory view illustrating the collected tune list generating process.
Figure 20:
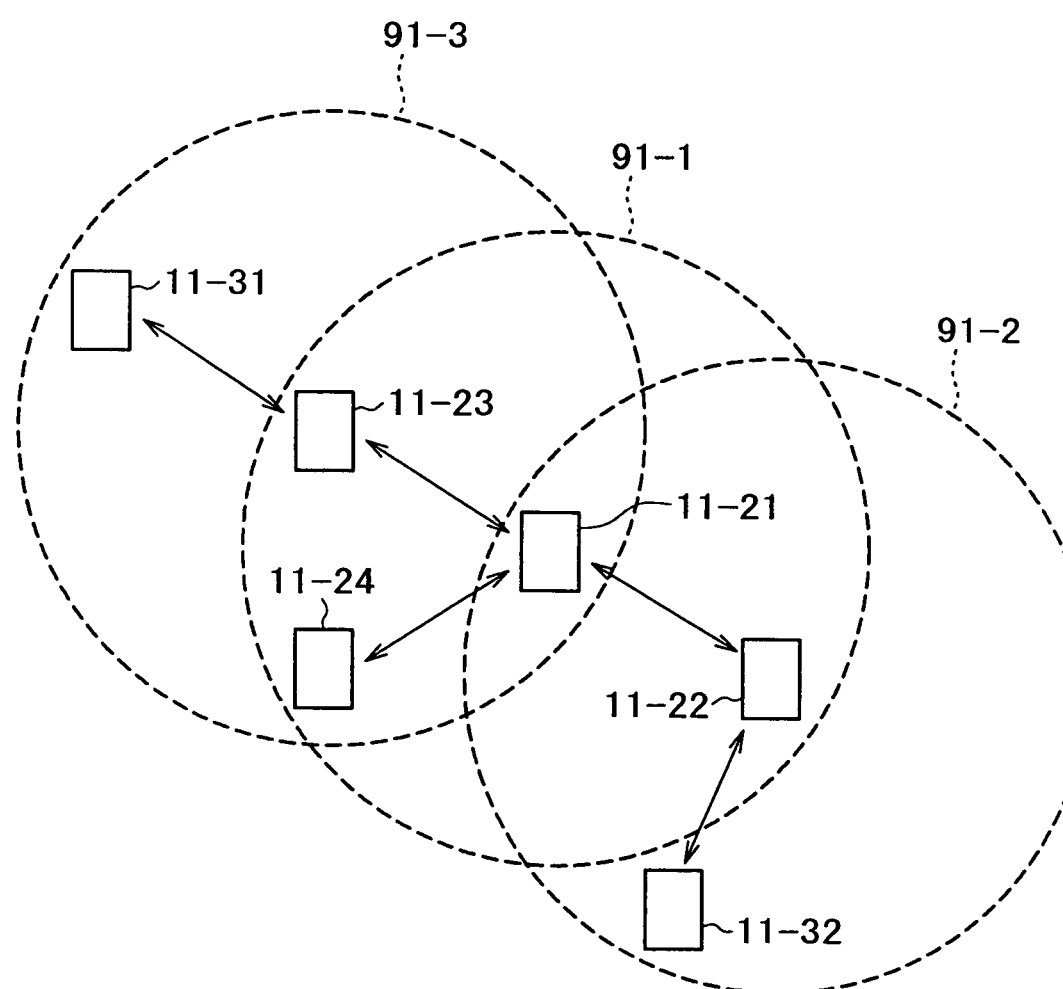
FIG. 20 is yet another explanatory view depicting the collected tune list generating process.

Suppose that as shown in FIG. 18, portable terminals 11-22 through 1-24 exist within an area 91-1, a communicable range of a terminal 11-21. In this case, the processing represented by the flowchart of FIG. 12 is carried out between the portable terminal 11-21 on the one hand and each of the terminals 11-22 trough 11-24 on the other hand. After the processing, exchanging of the recommended tune lists has been completed between the portable terminal 11-21 on the one hand and the terminals 11-22 trough 11-24 on the other hand, as depicted in FIG. 19. However, a collected tune list resulting from the exchanges in FIG. 18 amounts to being based on merely four users' recommended tune lists; the number of recommending users is too few to be reliably counted on as the reference for selecting favorite tunes. This drawback is bypassed illustratively by having the portable terminals 11-22 and 11-23 in the communicable area 91-1 of the terminal 11-21 communicate with a terminal 11-32 in a communicable area 91-2 of the terminal 11-22 and with a terminal 11-31 in a communicable area of 91-3 of the terminal 11-23, as illustrated in FIG. 20. Such a setup permits each portable terminal to exchange the recommended tune lists with a far larger number of terminal users than before.

This, however, can lead to an indefinite number of hops being made from portable terminal 11 to portable terminal 11 for communication; the number of hops must be suitably limited. A hop count stands for the number of portable terminals that exist between the two terminals exchanging recommended tune lists. For example, if the portable terminal 11-21 acquires recommended tune list from the terminal 11-22 as shown in FIG. 20, the hop count is zero because the two terminals communicate directly with each other. If the portable terminal 11-21 communicates with the terminal 11-32, the hop count is one because the terminal 11-22 interposingly connects the two communicating terminals.

FIG. 21 schematically shows a typical structure of a portable terminal 11 that may function as a repeater when interposed between the communicating terminals.

Figure 3:
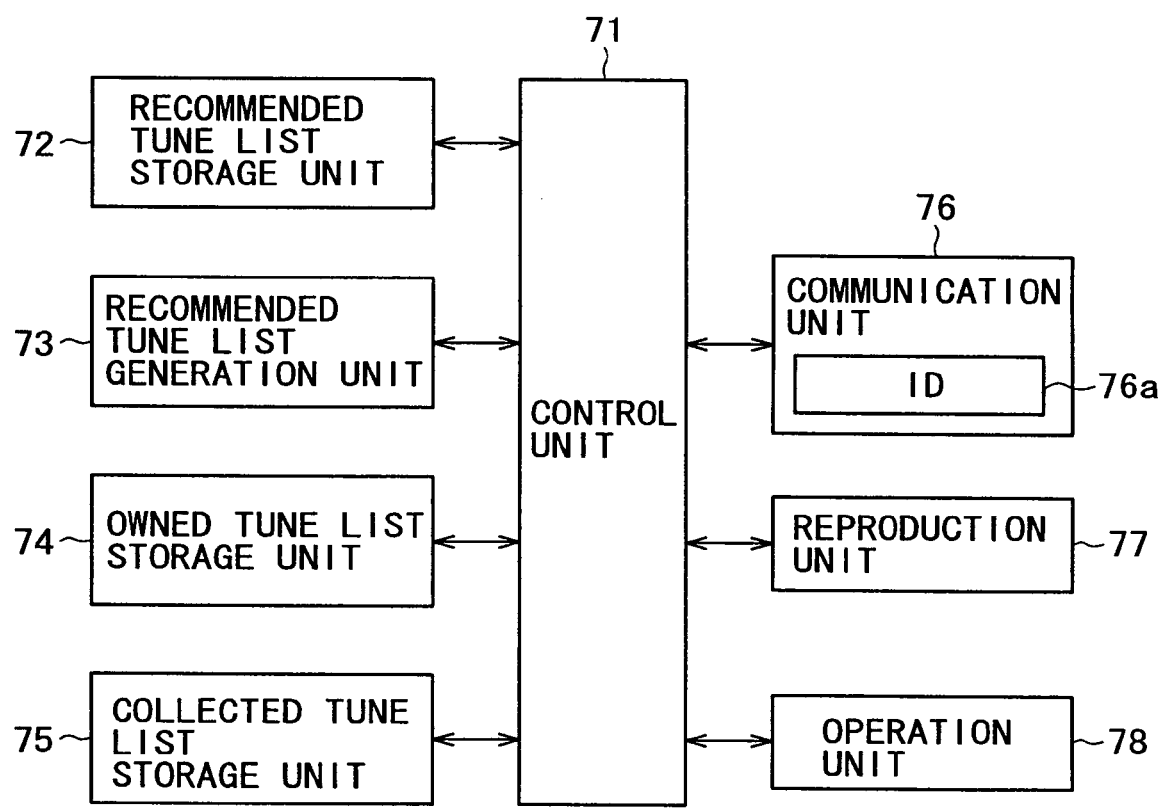
FIG. 3 is a function block diagram indicating some functions implemented by the portable terminal of FIG. 2.
Figure 4:
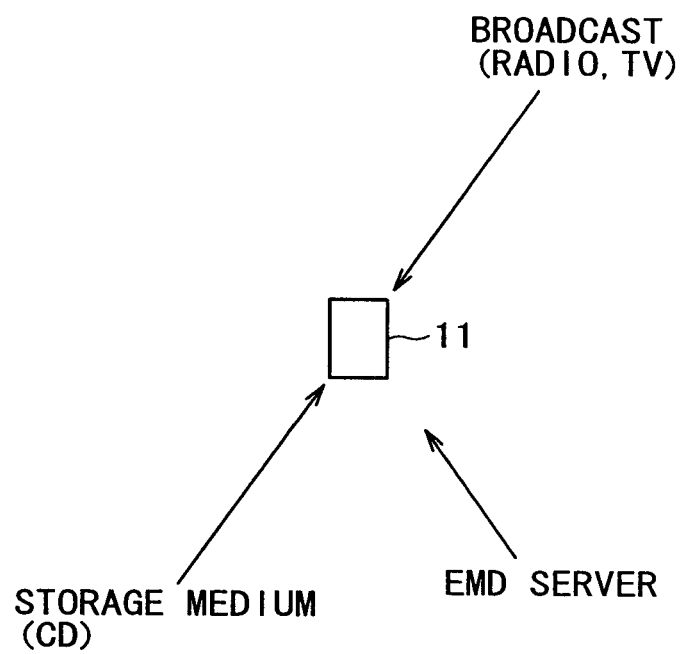
FIG. 4 is an explanatory view showing how tunes are included in an owned tune list.

In FIG. 21, the component units having identical or corresponding functions to their counterparts in FIG. 3 are designated by like reference numerals, and their descriptions are omitted where redundant. The major difference of the portable terminal 11 of FIG. 21 from that of FIG. 3 is that the terminal of FIG. 21 has a transfer unit 91 furnished anew. Whereas the basic function of the transfer unit 91 is the same as that of the communication unit 76, the transfer unit 91 associates ID 91a with data that are transferred. Illustratively, if the portable terminal 11-11 communicates with the terminal 11-32 via the terminal 11-22, the transfer unit 91 of the terminal 11-22 functions as a repeater which attaches its own ID 91a to all data it transfers. Each of the two communicating terminals 11 recognizes its own hop count by detecting the number of IDs 91a sent from the transfer units 91 of the interposing terminals 11 serving as repeaters. More specifically, if the portable terminal 11-11 communicates with the terminal 11-32, the terminal 11-32 finds that the ID 91a of the transfer unit of the terminal 11-22 are attached to all data coming from the communication unit 76 of the terminal 11-11. The portable terminal 11-32 recognizes its hop count by counting the number of received IDs (in this case, the hop count is one because there is one repeater's ID 91a received).

Figure 22:
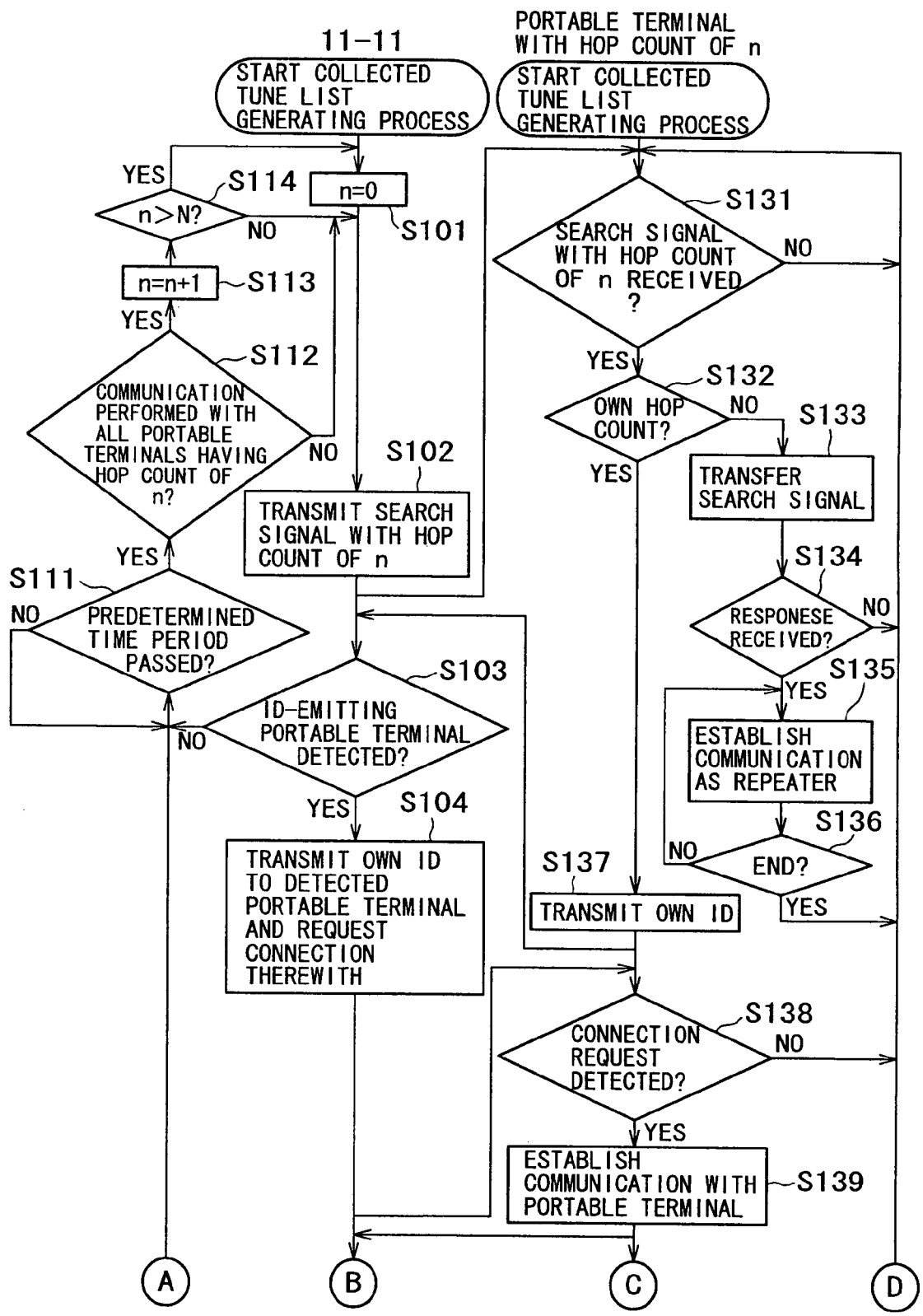
FIG. 22 is another flowchart of steps constituting the collected tune list generating process.
Figure 23:
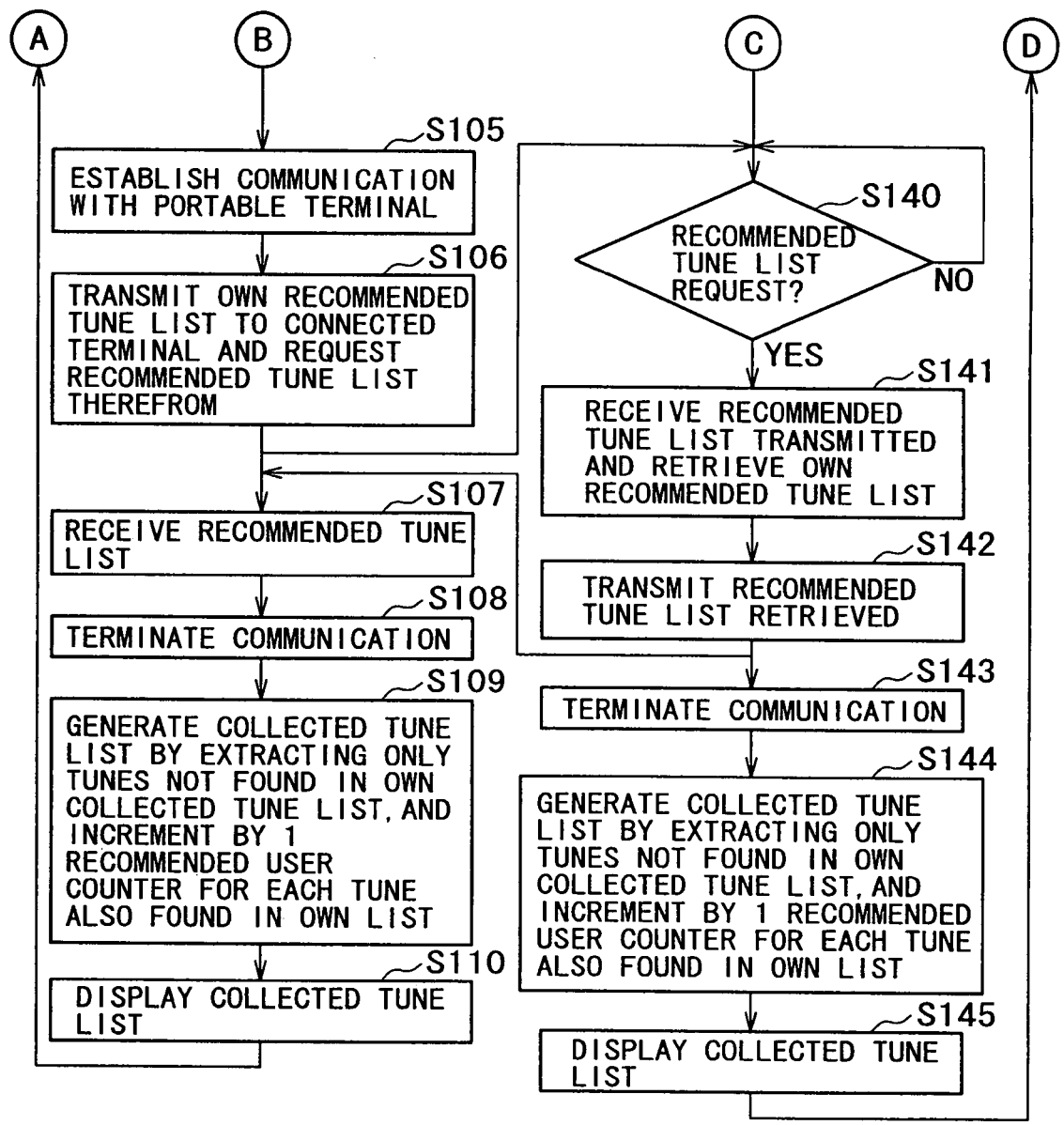
FIG. 23 is yet another flowchart of steps constituting the collected tune list generating process.

Described below with reference to the flowcharts of FIGS. 22 and 23 is how the portable terminals 11-11 and 11-32 in FIG. 20 communicate with each other by way of the portable terminal 11 of FIG. 21 in order to exchange recommended tune lists and thereby to generate a collected tune list each. In the flowcharts of FIGS. 22 and 23, steps S103 through S111 and step S137 through S145 are the same as steps S22 through S30 and steps S42 through S50, respectively, in FIG. 12 and thus will not be discussed further.

In step S101, the control unit 71 of the portable terminal 11-11 initializes an internal counter "n" to zero. In step S102, the control unit 71 of the terminal 11-11 transmits through the communication unit 76 a search signal to portable terminals 11 having a hop count of "n" each as viewed from terminal 11-11. In step S103, a check is made to see whether there exists nearby any portable terminal which emits an ID of 76a-11 and which has the hop count of "n" (in the description that follows, the portable terminals 11-11 and 11-22 are assumed to have IDs 76a-11 and 76a-22 respectively).

In step S131, the communication unit 76 of the portable terminal 11-22 having the hop count of zero determines whether any search signal with the hop count of "n" is detected. This step is repeated until the search signal is detected. If the search signal with the hop count of "n" was sent in step S102, the communication unit 76 of the portable terminal 11-22 determines in step S132 whether the detected search signal has the same hop count as this terminal. Initially, the hop count is set for zero, which is the same as the hop count of the terminal 11-22. In that case, step S137 is reached and the subsequent steps are repeated.

In step S112, the control unit 71 of the portable terminal 11-11 determines whether communication has been done with all portable terminals 11 having the hop count of "n" each. For example, after the portable terminal 11-11 has communicated with all terminals 11-22 through 11-24 shown in FIG. 20, the counter "n" is incremented by one (to reach the value "1" in this example) instep S113. In step S114, the control unit 71 of the portable terminal 11-11 determines whether the current hop count is greater than a predetermined hop count N. If the current hop count is found to be less than the predetermined hop count N, then step S102 is reached again.

In step S102, a search signal with a hop count "n"=1 is transmitted. In this case, the portable terminal 11-22 finds in step S132 that the received search signal does not carry its own hop count, so that the transfer unit 91 of the terminal 11-22 attaches the terminal's own ID 91a to the search signal with the hop count of one before transferring the signal in the communicable area 91-2. In the example of FIG. 20, the portable terminal 11-32 responds to the transferred search signal and proceeds to carry out steps S131, S132, and S137 through S145.

Meanwhile, the control unit 76 of the portable terminal 11-22 determines in step S134 whether a response to the search signal has been received. Because the response is found to be received from the portable terminal 11-32, the terminal 11-22 acts as a repeater in establishing communication with the terminal 11-32 in step S135. In step S136, a check is made to see if the communication is terminated. Steps S135 and S136 are repeated until the communication is found to have ended in step S136. While the two steps are being repeated, the portable terminal 11-22 functions as a repeater ensuring communication between the terminals 11-11 and 11-32 and attaching the terminal 11-22's own ID 91a to all data repeated between the two terminals.

At the end of the communication between the portable terminals 11-11 and 11-32, the repeater terminal determines that the communication has been terminated. Control is then returned to step S131.

Similar steps are carried out with regard to the portable terminal 11-31 by way of the terminal 11-23. When it is determined in step S112 that communication has been done with all portable terminal 11 having the hop count of one each, step S102 is reached in which a search signal with a hop count of two is transmitted. From step S102, the portable terminals 11-22 and 11-23 go to steps S131 through S134. The terminals 11-31 and 11-32 also perform the same steps S131 through S134. In the example of FIG. 20, there is no portable terminal 11 having a hop count of "n"=2, which means there is no response received. In that case, the portable terminals 11-22, 11-23, 11-31 and 11-32 each return to step S131.

If it is determined in step S114 that the hop count of "n" has become larger than the predetermined hop count N, control is returned to step S101, and the subsequent steps are repeated. In this manner, each portable terminal 11 can start communicating with the nearest terminal with the smallest hop count and gradually expand its range of communication until the farthest communicable terminals with the largest hop count allowed are reached and connected. In other words, setting in advance the hop count for a predetermined value N makes it possible for each portable terminal to limit its range of communicable terminals as desired.

It has been explained above that the portable terminal 11-11 gains access to nearby terminals one after another with their hop count getting larger in increments with each hop executed. Alternatively, whenever a new portable terminal 11-41 is found to have entered the communicable area 91-1 of the terminal 11-11 as indicated by a thick arrow in FIG. 24, the terminal 11-11 may start a new communication process with the newly detected terminal in order to exchange recommended tune lists.

With the inventive scheme in place as described, users can select their favorite tunes efficiently without recourse to a server. This minimizes line congestions on the server resources and leads to appreciable cost savings. Because each user is prompted to select favorite tunes on the basis of the tunes recommended by other users, each user's range of music selection can be expanded free from the user's traditionally preferred category of music. Since the choice of each user's preferred tunes is based on other users' recommended tunes considered to have cleared certain evaluation criteria, there is a much less burden on the user in selecting tunes accordingly. Because the recommended tunes are the tunes that are actually listened to by other portable terminal users at present, each user is able to know the currently popular tunes in real time. It is also possible for users to select favorite tunes according to local conditions (e.g., location, time of day, weather). More specifically, if a particular artist is holding a live concert in a specific location, there can be more users in the vicinity who recommend tunes of the artist in question. This enables the users sharing the preference for the same artist to recommend the artist's tunes to one another, allowing the devotees to readjust their selection of preferred tunes by the favored artist.

The series of steps described above may be executed either by hardware or by software. For software-based processing to take place, programs constituting the software may be either incorporated beforehand in dedicated hardware of a computer or installed upon use from a suitable storage medium into a general-purpose personal computer or like equipment capable of executing diverse functions.

As shown in FIG. 2, the program storage medium is offered to users not only in the form of the storage unit 38 which contains the programs and which is incorporated beforehand in the portable terminal 11, but also as a package medium constituted by the magnetic disc 51 (including floppy discs), optical disc 52 (including CD-ROM (Compact Disc-read only memory) and DVD (digital versatile disc)), magneto-optical disc 53 (including MD (Mini-disc; registered trademark)), or semiconductor memory 54 (including Memory Stick).

In this specification, the steps which are stored on the storage medium and which describe the programs to be executed represent not only the processes that are carried out in the depicted sequence (i.e., on a time series basis) but also processes that are conducted parallelly or individually.

In this specification, the term "system" refers to an entire configuration made up of a plurality of component devices.

As many apparently different embodiments of this invention may be made without departing from the spirit and scope thereof, it is to be understood that the invention is not limited to the specific embodiments thereof except as defined in the appended claims.

What is claimed is:

1. A portable terminal device operable to exchange a list of content data items wirelessly with plural other portable terminal devices, said portable terminal device comprising:
a communication unit configured to communicate via at least one wireless network with said plural other portable terminal devices, wherein said at least one wireless network does not include a dedicated server; and
a control unit configured to:
exchange, via the at least one wireless network, a list of content data items with each one of said plural other portable terminal devices, the exchange of a list of content data items with each said one other portable terminal device occurring when said one other portable terminal device is accessible via the at least one wireless network to said portable terminal device, said exchanging comprising said portable terminal device transferring a list identifying content data items indicated as being recommended by a user of the portable terminal device to said one other portable terminal device and receiving from said one other portable terminal device a list identifying content data items indicated as being recommended by a user of said one other portable terminal device;
generate a listing of individual recommended content data items included in lists received from said plural other portable terminal devices; and
increment a counter, for each individual recommended content data item included in the listing, indicating a number of lists received from said plural other portable terminal devices in which said individual recommended content data item was included.

2. The portable terminal device according to claim 1, wherein said control unit starts to exchange the list of content data items with said other portable terminal device when said control unit detects that said other portable terminal device is accessible via the at least one wireless network.

3. The portable terminal device according to claim 1, wherein said control unit exchanges lists of content data items with a plurality of other portable terminal devices accessible to said portable terminal device via the at least one wireless network.

4. The portable terminal device according to claim 1, wherein said control unit exchanges the list of content data items and content data items with the other portable terminal device.

5. The portable terminal device according to claim 1, wherein said control unit is operable to detect a third portable terminal device accessible to said other portable terminal device via the at least one wireless network.

6. The portable terminal device according to claim 1, wherein said control unit limits a number of hops to communicate with said other portable terminal device.

7. The portable terminal device according to claim 1, wherein said control unit is operable to detect that said other portable terminal device is accessible to said portable terminal device via the at least one wireless network.

8. The portable terminal device according to claim 1, wherein said content data item is a tune.

9. The portable terminal device according to claim 8, wherein said tune is an MP3 file.

10. The portable terminal device according to claim 8, further comprising a reproducing unit configured to reproduce a tune, and wherein said control unit controls said reproducing unit to reproduce a tune on said list of content data items, the tune having been received from said other portable terminal device.

11. A method of exchanging a list of content data items wirelessly, said method comprising steps of:
detecting, by a portable content data item exchanging device, that one of a plurality of portable devices is accessible via a wireless network, wherein the wireless network does not include a dedicated server;
exchanging, by the portable content data item exchanging device, a list of content data items with said one portable device via the wireless network, said exchanging comprising said portable content data exchanging device transferring a list identifying content data items indicated as being recommended by a user of said portable content data exchanging device to said one portable device and receiving from said one portable device a list identifying content data items indicated as being recommended by a user of said one portable device; and
employing, by the portable content data item exchanging device, the list received from said one portable device to update a listing of individual recommended content data items included in lists received by the portable content data item exchanging device from said plurality of portable devices, said updating comprising incrementing a counter for each individual recommended content data item, said counter indicating a number of lists received from said plurality of portable terminal devices in which the individual recommended content data item was included.

12. The method of claim 11, wherein the step of exchanging starts when said portable content data item exchanging device detects that said one portable device is accessible via the wireless network.

13. The method of claim 11, wherein said portable content data item exchanging device exchanges lists of content data items with each of said plurality of portable devices via at least one wireless network that comprises the wireless network over which said portable content data item exchanging device exchanges a list with said one portable device.

14. The method of claim 11, wherein said portable content data item exchanging device exchanges the list of content data items and content data items with said one portable device.

15. The method of claim 11, wherein said portable content data item exchanging device detects a second of said plurality of portable devices is accessible via the wireless network.

16. The method of claim 11, wherein said portable content data item exchanging device limits a number of hops to communicate with said one portable device.

17. The method of claim 11, wherein said content data item is a tune.

18. The method of claim 17, wherein said tune is an MP3 file.

19. The method of claim 17, further comprising steps of:
receiving, by said portable content data item exchanging device, a tune from said one portable device; and
reproducing, by said portable content data item exchanging device, said tune on said list of content data items.

20. A system wherein information is exchanged between devices in at least one ad-hoc network that does not include a dedicated server, said system comprising:
a plurality of portable devices, each portable device comprising;
a communication unit configured to communicate via the at least one ad-hoc network with each other portable device of the plurality of portable devices;
a control unit configured to:
transfer via the at least one ad-hoc network a list identifying content data items indicated as being recommended by a user of the portable device to each said other portable device, and receive from each said other portable device a list identifying content data items indicated as being recommended by a user of each said other portable device when each said other portable device is accessible via the at least one ad-hoc network;
generate a listing of individual recommended content data items included in lists received from each said other portable device; and
increment a counter, for each individual recommended content data item included in the listing, indicating a number of lists received from said plurality of portable devices in which said individual recommended content data item was included.

21. The system according to claim 20, wherein said control unit is further configured to start exchanging the list of content data items with another of said plurality of portable devices when said control unit detects that the another portable device is accessible via the at least one ad-hoc network.

22. The system according to claim 20, wherein said control unit is further configured to exchange lists of content data items with each of said plurality of other portable devices via the at least one ad-hoc network.

23. The system according to claim 20, wherein said control unit limits a number of hops to communicate with each said other portable device.

24. The system according to claim 20, wherein said control unit is operable to detect that another of said plurality of portable devices is accessible via the at least one ad-hoc network.

25. The system according to claim 20, wherein said content data item is a tune.

26. The system according to claim 25, wherein said tune is an MP3 file.

27. The system according to claim 25, further comprising a reproducing unit configured to reproduce the tune, and wherein said control unit controls said reproducing unit to reproduce a tune included on a list of content data items received from another of said plurality of portable devices.

* * * * *